US008329821B2

(12) United States Patent
Kurita et al.

(10) Patent No.: US 8,329,821 B2
(45) Date of Patent: Dec. 11, 2012

(54) THERMOPLASTIC ELASTOMER COMPOSITION FOR FOAMING, MOLDED FOAM THEREOF, COMPOSITION MOLDED PRODUCT USING THE MOLDED FOAM, AND INSTRUMENT PANEL FOR AUTOMOBILE

(75) Inventors: Hayato Kurita, Ichihara (JP); Toru Takehara, Ichihara (JP); Masakazu Jitsukata, Isumi (JP); Yuichi Ito, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 8 days.

(21) Appl. No.: 13/054,736

(22) PCT Filed: Jul. 14, 2009

(86) PCT No.: PCT/JP2009/062732
§ 371 (c)(1),
(2), (4) Date: Jan. 18, 2011

(87) PCT Pub. No.: WO2010/007984
PCT Pub. Date: Jan. 21, 2010

(65) Prior Publication Data
US 2011/0117358 A1      May 19, 2011

(30) Foreign Application Priority Data

Jul. 18, 2008  (JP) ................................. 2008-187643

(51) Int. Cl.
  *C08F 8/00*   (2006.01)
  *C08L 9/00*   (2006.01)
  *C08L 23/04*  (2006.01)
(52) U.S. Cl. .................... 525/191; 525/232; 525/240
(58) Field of Classification Search .................. 525/191, 525/232, 240
See application file for complete search history.

(56) References Cited

U.S. PATENT DOCUMENTS

| | | | |
|---|---|---|---|
| 3,806,558 A | | 4/1974 | Fischer |
| 5,206,301 A | | 4/1993 | Hattori et al. |
| 8,063,146 B2 | * | 11/2011 | Imai et al. ..................... 525/191 |
| 2006/0281868 A1 | * | 12/2006 | Sudhin et al. ................. 525/240 |
| 2010/0016458 A1 | | 1/2010 | Saitou et al. |

FOREIGN PATENT DOCUMENTS

| | | |
|---|---|---|
| JP | 48-026838 A | 4/1973 |
| JP | 54-112967 A | 9/1979 |
| JP | 62-257838 | 11/1987 |
| JP | 02-133406 A | 5/1990 |
| JP | 03-072512 A | 3/1991 |
| JP | 09-157426 A | 6/1997 |
| JP | 2007-261102 A | 10/2007 |
| JP | 2007-269829 A | 10/2007 |
| JP | 2007-269942 A | 10/2007 |
| JP | 2007-269943 A | 10/2007 |
| JP | 2007-284484 A | 11/2007 |
| JP | 2008-088283 A | 4/2008 |
| JP | 2009-073912 A | 4/2009 |
| WO | WO 2004/087775 A1 | 10/2004 |
| WO | WO 2009/084517 A1 | 7/2009 |

OTHER PUBLICATIONS

Communication (Extended European Search Report) in EP Appln No. 09797909.0, dated Nov. 2, 2011.
Database WPI, Week 198750, Thomson Scientific, London, GB; AN 1987-353181, XP002662012, pp. 1-2, date Oct. 26, 2011.
Kazuhisa Date, "Polypropylene, Plastics", vol. 57, No. 1, Jan. 1, 2006, pp. 31-36.

* cited by examiner

*Primary Examiner* — Nathan M Nutter
(74) *Attorney, Agent, or Firm* — Foley & Lardner LLP

(57) ABSTRACT

[Problem] To provide a thermoplastic elastomer composition for foaming, which has sufficient foamability and provides a molded article having good appearance. [Solution to Problem] A thermoplastic elastomer composition for foaming, which comprises 10 to 40% by weight of a partially or completely crosslinked ethylene/α-olefin/non-conjugated polyene copolymer rubber (A) comprising ethylene, an α-olefin of 3 to 20 carbon atoms and a non-conjugated polyene, 3 to 33% by weight of an ethylene/α-olefin copolymer (B) comprising ethylene and an α-olefin of 3 to 20 carbon atoms, 10 to 40% by weight of polypropylene (C) having a melting point, as determined by differential scanning calorimetry (DSC), of 40 to 170° C., 10 to 45% by weight of a softener (D) for rubbers, and at least one substance selected from an isotactic propylene-based polymer (E-a) in an amount of 1 to 30% by weight and a syndiotactic α-olefin-based copolymer (E-b) in an amount of 1 to 20% by weight, with the proviso that the total amount of the components (A), (B), (C), (D), (E-a) and (E-b) is 100% by weight.

10 Claims, No Drawings

THERMOPLASTIC ELASTOMER COMPOSITION FOR FOAMING, MOLDED FOAM THEREOF, COMPOSITION MOLDED PRODUCT USING THE MOLDED FOAM, AND INSTRUMENT PANEL FOR AUTOMOBILE

TECHNICAL FIELD

The present invention relates to a thermoplastic elastomer composition for foaming, a molded foam thereof and a composite molded product obtained by laminating the molded foam.

BACKGROUND ART

For automotive interior trim, a vinyl chloride resin has been widely used in the past. Since the vinyl chloride resin is not only excellent in molding processability into parts but also relatively inexpensive, it has been often used for skin materials of interior parts, such as instrument panel, door and ceiling, handle materials, knobs of gearshifts, various grips, etc. In recent years, however, it has been pointed out that the vinyl chloride resin has a possibility of becoming a cause of a harmful gas when it is incinerated, and in the above parts, replacement of the vinyl chloride resin with other materials has become the main stream.

Especially in the automotive interior trim, most widely used as a substitute for the vinyl chloride resin is a thermoplastic elastomer. Since the thermoplastic elastomer is an excellent material from the viewpoints that it is lightweight, is excellent in moldability and processability into parts, can be readily recycled and generates no harmful gas when it is incinerated, uses of the thermoplastic elastomer have been further increased.

In the use applications to interior trim skins that are typical use applications of the thermoplastic elastomer, the thermoplastic elastomer is generally used for instrument panel skins, door skins, ceiling skins, console skins, etc. at present by processing a thermoplastic elastomer sheet, which is obtained by extrusion method or calendaring, through vacuum forming or stamping and then laminating the resulting product onto a substrate of foamed polyurethane or foamed polypropylene. As a method for such laminating, there is known a method of casting liquid urethane between a substrate and a thermoplastic elastomer or a method of integrally molding a substrate resin with a laminated sheet of a thermoplastic elastomer and foamed polypropylene through injection compression molding.

In recent years, a method in which a step of laminating foamed polyurethane or foamed polypropylene is omitted for the purpose of simplifying the process and a foamed thermoplastic elastomer is laminated onto a substrate resin itself has been proposed. In this method, however, there resides a problem that a soft feel required is not obtained because of insufficient foamability of the thermoplastic elastomer or good appearance is not obtained because of non-uniform foaming.

On the other hand, with regard to automotive materials, studies of foaming of a thermoplastic elastomer have been made from the viewpoint of weight lightening. Usual thermoplastic elastomers, such as olefin-based plastic components of patent literatures 1 and 2, are decomposed when they are dynamically heat-treated in the presence of an organic peroxide, and have poor tension during melting. Therefore, such thermoplastic elastomers have problems that they are liable to be defoamed, and even if a foam is obtained, its expansion ratio is at most about 1.5 times and surface roughening due to defoaming is marked. Moreover, there is another problem that if the amount of the organic peroxide added is reduced, heat resistance of the resulting molded article is lowered though the foamability is improved.

In patent literatures 3 and 4, a foam containing a polyolefin-based resin having a melt tension of a specific value or more has been proposed, and in a patent literature 5, a composition the longest relaxation time of which was limited has been proposed, but sufficient foamability has not been obtained.

In the patent literature 5, it has been proposed that by the use of a thermoplastic elastomer containing a propylene/α-olefin copolymer having a specific molecular weight distribution, a soft feel and appearance of good quality are obtained in injection molding. In such composition, however, sufficient foamability is not obtained, and therefore, a soft feel required is not obtained. Moreover, if the amount of a blowing agent is increased in order to sufficiently increase foamability, there is a disadvantage of deterioration of appearance though desired foamability is obtained.

In patent literatures 6 to 9, a plastic having a syndiotactic structure, addition of a high-molecular weight component, etc. have been proposed, but sufficient foamability has not been obtained.

CITATION LIST

Patent Literature

Patent literature 1: Japanese Patent Laid-Open Publication No. 26838/1973
Patent literature 2: Japanese Patent Laid-Open Publication No. 112967/1979
Patent literature 3: Japanese Patent Laid-Open Publication No. 284484/2007
Patent literature 4: Japanese Patent Laid-Open Publication No. 088283/2008
Patent literature 5: Japanese Patent Laid-Open Publication No. 157426/1997
Patent literature 6: Japanese Patent Laid-Open Publication No. 261102/2007
Patent literature 7: Japanese Patent Laid-Open Publication No. 269829/2007
Patent literature 8: Japanese Patent Laid-Open Publication No. 269942/2007
Patent literature 9: Japanese Patent Laid-Open Publication No. 269943/2007

SUMMARY OF INVENTION

Technical Problem

It is an object of the present invention to develop a thermoplastic elastomer composition for foaming, which has sufficient foamability and provides a molded article having good appearance.

Solution to Problem

The present inventors have earnestly studied a thermoplastic elastomer composition for foaming, which can solve the problems in the prior art, has sufficient foamability and provides a molded article having good appearance, and consequently, they have accomplished the present invention.

That is to say, the present invention contains the following matters.

[1] A thermoplastic elastomer composition for foaming, comprising:

10 to 40% by weight of a partially or completely crosslinked ethylene/α-olefin/non-conjugated polyene copolymer rubber (A) comprising ethylene, an α-olefin of 3 to 20 carbon atoms and a non-conjugated polyene, 3 to 33% by weight of an ethylene/α-olefin copolymer (B) comprising ethylene and an α-olefin of 3 to 20 carbon atoms, 10 to 40% by weight of polypropylene (C) having a melting point, as determined by differential scanning calorimetry (DSC), of 40 to 170° C., 10 to 45% by weight of a softener (D) for rubbers, and at least one substance selected from an isotactic propylene-based polymer (E-a) in an amount of 1 to 30% by weight and a syndiotactic α-olefin-based copolymer (E-b) in an amount of 1 to 20% by weight, with the proviso that the total amount of the components (A), (B), (C), (D), (E-a) and (E-b) is 100% by weight, wherein the component (E-a) satisfies the following requirements (i) to (iv):

(i) the molecular weight distribution (Mw/Mn), as measured by gel permeation chromatography (GPC), is in the range of 1 to 10, (ii) the amount of constitutional units derived from propylene is in the range of 40 to 85% by mol and the amount of constitutional units derived from an α-olefin of 2 to 20 carbon atoms (other than propylene) is in the range of 60 to 15% by mol, (iii) the melt flow rate (MFR, ASTM D1238, 190° C., load of 2.16 kg) is in the range of 0.1 to 50 g/10 min, and (iv) in the differential scanning calorimetry (DSC), any melting point is not observed, the component (E-b) contains constitutional units (E-1) derived from propylene, constitutional units (E-2) derived from ethylene, constitutional units (E-3) derived from an olefin of 4 to 20 carbon atoms, and if necessary, constitutional units (E-4) derived from a conjugated polyene or a non-conjugated polyene, the component (E-b) contains the constitutional units (E-1) in an amount of 30 to 79% by mol, the constitutional units (E-2) in an amount of 1 to 30% by mol and the constitutional units (E-3) in an amount of 10 to 50% by mol, in 100% by mol of the total of the constitutional units (E-1), (E-2) and (E-3), with the proviso that the total amount of the constitutional units (E-2) and (E-3) is in the range of 21 to 70% by mol, and contains the constitutional units (E-4) in an amount of 0 to 30% by mol based on 100% by mol of the total of the constitutional units (E-1), (E-2) and (E-3), and when $^{13}$C-NMR of the component (E-b) is measured in a 1,2,4-trichlorobenzene solution using tetramethylsilane as a reference material, the sum total of absorptions of methyl groups of propylene units observed at about 20.0 to 21.0 ppm is not less than 0.5 time the sum total of absorptions of methyl groups of propylene units observed at about 19.0 to 22.0 ppm, and the component (E-b) has a substantially syndiotactic structure.

[2] The thermoplastic elastomer composition for foaming as stated in [1], which comprises:

10 to 40% by weight of a partially or completely crosslinked ethylene/α-olefin/non-conjugated polyene copolymer rubber (A) comprising ethylene, an α-olefin of 3 to 20 carbon atoms and a non-conjugated polyene, 3 to 33% by weight of an ethylene/α-olefin copolymer (B) comprising ethylene and an α-olefin of 3 to 20 carbon atoms, 10 to 40% by weight of polypropylene (C) having a melting point, as determined by differential scanning calorimetry (DSC), of 40 to 170° C., 10 to 45% by weight of a softener (D) for rubbers, and 1 to 30% by weight of an isotactic propylene-based polymer (E-a) satisfying the following requirements (i) to (iv), with the proviso that the total amount of the components (A), (B), (C), (D) and (E-a) is 100% by weight, (i) the molecular weight distribution (Mw/Mn), as measured by gel permeation chromatography (GPC), is in the range of 1 to 10, (ii) the amount of constitutional units derived from propylene is in the range of 40 to 85% by mol and the amount of constitutional units derived from an α-olefin of 2 to 20 carbon atoms (other than propylene) is in the range of 60 to 15% by mol, (iii) the melt flow rate (MFR, ASTM D1238, 190° C., load of 2.16 kg) is in the range of 0.1 to 50 g/10 min, and (iv) in the differential scanning calorimetry (DSC), any melting point is not observed.

[3] The thermoplastic elastomer composition for foaming as stated in [1], which comprises:

10 to 40% by weight of a partially or completely crosslinked ethylene/α-olefin/non-conjugated polyene copolymer rubber (A) comprising ethylene, an α-olefin of 3 to 20 carbon atoms and a non-conjugated polyene, 3 to 33% by weight of an ethylene/α-olefin copolymer (B) comprising ethylene and an α-olefin of 3 to 20 carbon atoms, 10 to 40% by weight of polypropylene (C) having a melting point, as determined by differential scanning calorimetry (DSC), of 40 to 170° C., 10 to 45% by weight of a softener (D) for rubbers, and 1 to 20% by weight of a syndiotactic α-olefin-based copolymer (E-b), with the proviso that the total amount of the components (A), (B), (C), (D) and (E-b) is 100% by weight, wherein the component (E-b) contains constitutional units (E-1) derived from propylene, constitutional units (E-2) derived from ethylene, constitutional units (E-3) derived from an olefin of 4 to 20 carbon atoms, and if necessary, constitutional units (E-4) derived from a conjugated polyene or a non-conjugated polyene, the component (E-b) contains the constitutional units (E-1) in an amount of 30 to 79% by mol, the constitutional units (E-2) in an amount of 1 to 30% by mol and the constitutional units (E-3) in an amount of 10 to 50% by mol, in 100% by mol of the total of the constitutional units (E-1), (E-2) and (E-3), with the proviso that the total amount of the constitutional units (E-2) and (E-3) is in the range of 21 to 70% by mol, and contains the constitutional units (E-4) in an amount of 0 to 30% by mol based on 100% by mol of the total of the constitutional units (E-1), (E-2) and (E-3), and when $^{13}$C-NMR of the component (E-b) is measured in a 1,2,4-trichlorobenzene solution using tetramethylsilane as a reference material, the sum total of absorptions of methyl groups of propylene units observed at about 20.0 to 21.0 ppm is not less than 0.5 time the sum total of absorptions of methyl groups of propylene units observed at about 19.0 to 22.0 ppm, and the component (E-b) has a substantially syndiotactic structure.

[4] The thermoplastic elastomer composition for foaming as stated in any one of [1] to [3], which further comprises a hydrogenated conjugated diene copolymer (F) in an amount of 1 to 30 parts by weight based on 100 parts by weight of the total of the components (A), (B), (C), (D), and (E-b) and/or (E-a).

[5] The thermoplastic elastomer composition for foaming as stated in any one of [1] to [4], wherein the component (C) contains polypropylene (c) having a melt tension value, at 190° C., of not less than 3 g, and in 100 parts by weight of the component (C), the polypropylene (c) is contained in an amount of 1 to 50 parts by weight.

[6] The thermoplastic elastomer composition for foaming as stated in any one of [1] to [5], which is obtained by further adding a blowing agent (H).

[7] A thermoplastic elastomer molded foam obtained by molding the thermoplastic elastomer composition for foaming as stated in [6].

[8] The thermoplastic elastomer molded foam as stated in [7], wherein the molding is injection molding.

[9] A composite molded product obtained by laminating the molded foam as stated in [7] or [8] onto a polyolefin-based resin substrate.

[10] An instrument panel for automobile, obtained by using the molded product as stated in any one of [7] to [9].

Advantageous Effects of Invention

According to the present invention, a thermoplastic elastomer composition for foaming, which is excellent in foamability, heat resistance and flexibility and provides a molded article having excellent appearance, can be obtained.

DESCRIPTION OF EMBODIMENTS

The thermoplastic elastomer composition for foaming of the present invention comprises 10 to 40% by weight of a partially or completely crosslinked ethylene/α-olefin/non-conjugated polyene copolymer rubber (A) comprising ethylene, an α-olefin of 3 to 20 carbon atoms and a non-conjugated polyene, 3 to 33% by weight of an ethylene/α-olefin copolymer (B) comprising ethylene and an α-olefin of 3 to 20 carbon atoms, 10 to 40% by weight of polypropylene (C) having a melting point, as determined by differential scanning calorimetry (DSC), of 40 to 170° C., 10 to 45% by weight of a softener (D) for rubbers, and at least one substance selected from an isotactic propylene-based polymer (E-a) in an amount of 1 to 30% by weight and a syndiotactic α-olefin-based copolymer (E-b) in an amount of 1 to 20% by weight, with the proviso that the total amount of the components (A), (B), (C), (D), (E-a) and (E-b) is 100% by weight, and is characterized in that the component (E-a) satisfies the following requirements: (i) the molecular weight distribution (Mw/Mn), as measured by gel permeation chromatography (GPC), is in the range of 1 to 10, (ii) the amount of constitutional units derived from propylene is in the range of 40 to 85% by mol and the amount of constitutional units derived from an α-olefin of 2 to 20 carbon atoms (other than propylene) is in the range of 60 to 15% by mol, (iii) the melt flow rate (MFR, ASTM D1238, 190° C., load of 2.16 kg) is in the range of 0.1 to 50 g/10 min, and (iv) in the differential scanning calorimetry (DSC), any melting point is not observed; the component (E-b) contains constitutional units (E-1) derived from propylene, constitutional units (E-2) derived from ethylene, constitutional units (E-3) derived from an olefin of 4 to 20 carbon atoms, and if necessary, constitutional units (E-4) derived from a conjugated polyene or a non-conjugated polyene; the component (E-b) contains the constitutional units (E-1) in an amount of 30 to 79% by mol, the constitutional units (E-2) in an amount of 1 to 30% by mol and the constitutional units (E-3) in an amount of 10 to 50% by mol, in 100% by mol of the total of the constitutional units (E-1), (E-2) and (E-3), with the proviso that the total amount of the constitutional units (E-2) and (E-3) is in the range of 21 to 70% by mol, and contains the constitutional units (E-4) in an amount of 0 to 30% by mol based on 100% by mol of the total of the constitutional units (E-1), (E-2) and (E-3); and when $^{13}$C-NMR of the component (E-b) is measured in a 1,2,4-trichlorobenzene solution using tetramethylsilane as a reference material, the sum total of absorptions of methyl groups of propylene units observed at about 20.0 to 21.0 ppm is not less than 0.5 time the sum total of absorptions of methyl groups of propylene units observed at about 19.0 to 22.0 ppm, and the component (E-b) has a substantially syndiotactic structure.

That is to say, the thermoplastic elastomer composition for foaming of the present invention has two embodiments.

The first embodiment is an invention of a thermoplastic elastomer composition for foaming, comprising an ethylene/α-olefin/non-conjugated polyene copolymer rubber (A), an ethylene/α-olefin copolymer (B), polypropylene (C), a softener (D) for rubbers and an isotactic propylene-based polymer (E-a) (this invention being referred to as the "present invention (1)" hereinafter).

The second embodiment is an invention of a thermoplastic elastomer composition for foaming, comprising an ethylene/α-olefin/non-conjugated polyene copolymer rubber (A), an ethylene/α-olefin copolymer (B), polypropylene (C), a softener (D) for rubbers and a syndiotactic α-olefin-based copolymer (E-b) or a thermoplastic elastomer composition for foaming, comprising an ethylene/α-olefin/non-conjugated polyene copolymer rubber (A), an ethylene/α-olefin copolymer (B), polypropylene (C), a softener (D) for rubbers, an isotactic propylene-based polymer (E-a) and a syndiotactic α-olefin-based copolymer (E-b) (this invention being referred to as the "present invention (2)" hereinafter).

First, the present invention 1) is described in detail.

Partially or Completely Crosslinked Ethylene/α-Olefin/Non-Conjugated Polyene Copolymer Rubber (A) Comprising Ethylene, α-Olefin of 3 to 20 Carbon Atoms and Non-Conjugated Polyene The partially or completely crosslinked ethylene/α-olefin/non-conjugated polyene copolymer rubber (A) for use in the present invention (1) is a rubber obtained by partially or completely crosslinking a copolymer rubber comprising ethylene, an α-olefin of 3 to 20 carbon atoms and a non-conjugated polyene.

Examples of the α-olefins of 3 to 20 carbon atoms include propylene, 1-butene, 4-methylpentene-1,1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-1,11-methyldodecene-1 and 12-ethyltetradecene-1. Of these, propylene, 1-butene, 4-methylpentene-1,1-hexene and 1-octene are preferable, and propylene is particularly preferable.

These α-olefins are used singly or in combination of two or more kinds.

Examples of the non-conjugated polyenes include chain non-conjugated dienes, such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecadiene; cyclic non-conjugated dienes, such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes, such as 2,3-diisopropylidene-5-norbornene, 2-ethylidene-3-isopropylidene-5-norbornene, 2-propenyl-2,2-norbornadiene and 4-ethylidene-8-methyl-1, 7-nonadiene. Of these, 5-ethylidene-2-norbornene and 5-vinyl-2-norbornene are preferable.

These non-conjugated polyenes are used singly or in combination of two or more kinds.

The partially or completely crosslinked ethylene/α-olefin/non-conjugated polyene copolymer rubber (A) for use in the present invention (1) contains constitutional units (a) derived from ethylene and constitutional units (b) derived from an α-olefin of 3 to 20 carbon atoms in a molar ratio of usually 40/60 to 95/5, preferably 60/40 to 80/20, more preferably 65/35 to 75/25.

If necessary, another ethylene/α-olefin copolymer rubber may be blended.

Examples of the α-olefins to constitute another ethylene/α-olefin copolymer rubber include the same α-olefins as those for constituting the ethylene/α-olefin/non-conjugated polyene copolymer rubber. The copolymer rubber contains constitutional units derived from ethylene in an amount of usually not less than 50% by mol, preferably 50 to 90% by mol, more preferably 60 to 85% by mol, and contains constitutional units derived from an α-olefin of 3 to 20 carbon atoms in an amount of usually not more than 50% by mol, preferably 50 to 10% by mol, more preferably 40 to 15% by mol, with the proviso that the total amount of the ethylene units and the α-olefin units is 100% by mol.

The iodine value that is an indication for measuring the amount of the non-conjugated polyene component in the partially or completely crosslinked ethylene/α-olefin/non-conjugated polyene copolymer rubber (A) for use in the present invention (1) is in the range of usually 1 to 50, preferably 5 to 40, more preferably 10 to 30. That is to say, the non-conjugated diene units are contained in an amount of 2 to 20% by weight in 100% by weight of the total of the ethylene units, the units of the α-olefin of 3 to 20 carbon atoms and the non-conjugated polyene units.

The partially or completely crosslinked ethylene/α-olefin/non-conjugated polyene copolymer rubber (A) for use in the present invention (1) has an intrinsic viscosity [η], as measured in decalin at 135° C., of usually 1.0 to 10.0 dl/g, preferably 1.5 to 8.0 dl/g, and a Mooney viscosity [$ML_{1+4}$ (100° C.)] of usually 10 to 250, preferably 30 to 150.

The partially or completely crosslinked ethylene/α-olefin/non-conjugated polyene copolymer rubber (A) for use in the present invention (1) can be prepared by a hitherto publicly known process.

The partially or completely crosslinked ethylene/α-olefin/non-conjugated polyene copolymer rubber (A) for use in the present invention (1) is a rubber obtained by partially or completely crosslinking the above ethylene/α-olefin/non-conjugated polyene copolymer rubber. Examples of crosslinking agents used herein include organic peroxides, sulfur, sulfur compounds, and phenol-based vulcanizing agents such as a phenolic resin. Preferable are organic peroxides.

Examples of the organic peroxides include dicumyl peroxide, di-t-butyl peroxide, 2,5-dimethyl-2,5-di(t-butylperoxy)hexane, 2,5-dimethyl-2,5-di(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butyl perbenzoate, t-butyl peroxyisopropyl carbonate, diacetyl peroxide, lauroyl peroxide and t-butyl cumyl peroxide. From the viewpoints of odor and scorch stability, 2,5-dimethyl-2,5-di(t-butylperoxy)hexane, 2,5-dimethyl-2,5-di(t-butylperoxy)hexyne-3,1,3-bis(t-butylperoxyisopropyl)benzene, 1,1-bis(t-butylperoxy)-3,3,5-trimethylcyclohexane and n-butyl-4,4-bis(t-butylperoxy)valerate are preferable among them, and 1,3-bis(t-butylperoxyisopropyl)benzene is particularly preferable.

Such an organic peroxide is used in an amount of usually 0.02 to 3 parts by weight, preferably 0.05 to 1 part by weight, based on 100 parts by weight of the partially or completely crosslinked ethylene/α-olefin/non-conjugated polyene copolymer rubber (A).

In the crosslinking using the organic peroxide, crosslinking assistants, such as sulfur, p-quinonedioxime, p,p'-dibenzoyl quinonedioxime, N-methyl-N,4-dinitrosoaniline, nitrobenzene, diphenylguanidine and trimethylolpropane-N,N'-m-phenylenedimaleimide, divinylbenzene, triallyl cyanurate, polyfunctional methacrylate monomers, such as ethylene glycol dimethacrylate, diethylene glycol dimethacrylate, polyethylene glycol dimethacrylate, trimethylolpropane trimethacrylate and allyl methacrylate, and polyfunctional vinyl monomers, such as vinyl butyrate and vinyl stearate, may be incorporated. By incorporating such compounds, uniform and mild crosslinking reaction can be expected.

The above compound, such as a crosslinking assistant or a polyfunctional vinyl monomer, is used in an amount of usually not more than 5 parts by weight, preferably 0.3 to 3 parts by weight, based on 100 parts by weight of the partially or completely crosslinked ethylene/α-olefin/non-conjugated polyene copolymer rubber (A).

The dynamic heat treatment is preferably carried out in a non-open type apparatus, and is preferably carried out in an atmosphere of an inert gas such as nitrogen or carbonic acid gas. The temperature of the heat treatment is in the range of the melting point of a thermoplastic resin other than the ethylene/α-olefin/non-conjugated polyene copolymer rubber (A) in the composition to 300° C., and is in the range of usually 150 to 290° C., preferably 170 to 270° C. The kneading time is in the range of usually 1 to 20 minutes, preferably 1 to 10 minutes. The shear force applied is in the range of usually 10 to 100,000 $sec^{-1}$, preferably 100 to 50,000 $sec^{-1}$, in terms of shear rate.

In order to accelerate decomposition of the organic peroxide, decomposition accelerators, e.g., tertiary amines, such as triethylamine, tributylamine and 2,4,6-tri(dimethylamino)phenol, and naphthenates of aluminum, cobalt, vanadium, copper, calcium, zirconium, manganese, magnesium, lead, mercury and the like, may be used.

Although the crosslinking method is not specifically restricted, crosslinking can be carried out by dynamically heat-treating the ethylene/α-olefin/non-conjugated polyene copolymer rubber (A) in the presence or absence of a crosslinking agent. The expression "dynamically heat-treating" means kneading in a molten state.

The partially or completely crosslinked ethylene/α-olefin/non-conjugated polyene copolymer rubber (A) for use in the present invention (1) may be a rubber prepared by adding the later-described polypropylene (C) to the ethylene/α-olefin/non-conjugated polyene copolymer rubber in advance and dynamically heat-treating the mixture together with the softener (D) for rubbers and other additives.

The partially or completely crosslinked ethylene/α-olefin/non-conjugated polyene copolymer rubber (A) for use in the present invention (1) is contained in an amount of 10 to 40% by weight, preferably 12 to 38% by weight, more preferably 14 to 36% by weight, in 100% by weight of the total of the components (A), (B), (C), (D) and (E-a).

Ethylene/α-Olefin Copolymer (B) Comprising Ethylene and α-Olefin of 3 to 20 Carbon Atoms The ethylene/α-olefin copolymer (B) for use in the present invention (1) is a non-crosslinked rubber comprising ethylene and an α-olefin of 3 to 20 carbon atoms.

Examples of the α-olefins of 3 to 20 carbon atoms include propylene, 1-butene, 4-methylpentene-1,1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-1,11-methyldodecene-1 and 12-ethyltetradecene-1. Of these, propylene, 1-butene, 4-methylpentene-1,1-hexene and 1-octene are preferable, and propylene and 1-butene are more preferable.

These α-olefins are used singly or in combination of two or more kinds.

The ethylene/α-olefin copolymer (B) for use in the present invention (1) contains constitutional units (a) derived from ethylene and constitutional units (b) derived from an α-olefin of 3 to 20 carbon atoms in a molar ratio of usually 50/50 to 98/2, preferably 60/40 to 95/5, more preferably 65/35 to 90/5.

The ethylene/α-olefin copolymer (B) for use in the present invention (1) may contain a non-conjugated polyene, when needed. Examples of the non-conjugated polyenes include chain non-conjugated dienes, such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecadiene; cyclic non-conjugated dienes, such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes, such as 2,3-diisopropylidene-5-norbornene, 2-ethylidene-3-isopropylidene-5-norbornene, 2-propenyl-2,2-norbornadiene and 4-ethylidene-8-methyl-1,7-nonadiene. Of these, 5-ethylidene-2-norbornene and 5-vinyl-2-norbornene are preferable. These non-conjugated polyenes are used singly or in combination of two or more kinds.

When the non-conjugated polyene is contained, the content of non-conjugated polyene units in 100% by weight of the total of the ethylene units, the units of the α-olefin of 3 to 20 carbon atoms and the non-conjugated polyene units is in the range of 2 to 20% by weight.

The iodine value that is an indication for measuring the amount of the non-conjugated polyene component is in the range of usually 1 to 50, preferably 5 to 40, more preferably 10 to 30.

The ethylene/α-olefin copolymer (B) for use in the present invention (1) has MFR of usually 0.1 to 500 g/10 min, preferably 0.3 to 200 g/10 min, and an intrinsic viscosity [η], as measured in decalin at 135° C., of usually 0.2 to 5.0 dl/g, preferably 0.5 to 3.0 dl/g.

When the ethylene/α-olefin copolymer (B) for use in the present invention (1) contains constitutional units derived from the non-conjugated polyene, the Mooney viscosity [$ML_{1+4}$ (100° C.)] of the ethylene/α-olefin copolymer (B) is in the range of usually 1 to 100, preferably 3 to 70.

The ethylene/α-olefin copolymer (B) for use in the present invention (1) can be prepared by a hitherto publicly known process.

The ethylene/α-olefin copolymer (B) for use in the present invention (1) is contained in an amount of 3 to 33% by weight, preferably 7 to 30% by weight, more preferably 9 to 28% by weight, in 100% by weight of the total of the components (A), (B), (C), (D) and (E-a).

Polypropylene (C)

The polypropylene (C) for use in the present invention (1) is a polymer obtained by using propylene as a main component. The polypropylene (C) for use in the present invention (1) is a propylene homopolymer or a copolymer of propylene and a small amount of an α-olefin of 2 to 20 carbon atoms (other than propylene), and contains propylene units in an amount of not less than 50% by mol, preferably not less than 60% by mol, in 100% by mol of the total of the propylene units and the units of the α-olefin of 2 to 20 carbon atoms (other than propylene).

Examples of the polypropylenes (C) include a propylene homopolymer, a propylene/ethylene block copolymer, a propylene/ethylene random copolymer and a propylene/ethylene/1-butene random copolymer. Taking heat resistance, etc. into account, a propylene homopolymer or a propylene/ethylene block copolymer is preferable among them.

The polypropylene (C) may be one having an isotactic structure, may be one having a syndiotactic structure or may be a blend of them.

The polypropylene (C) has a melting point, as determined by differential scanning calorimetry (DSC), of 40 to 170° C., preferably 50 to 167° C., more preferably 60 to 165° C. Measurement of the melting point by DSC is carried out when the sample is held at 200° C. for 5 minutes, then cooled down to −20° C. at a cooling rate of −20° C./min and heated again up to 180° C. at a heating rate of 20° C./min. When the melting point of the polypropylene (C) is in the above range, sufficient heat resistance is obtained, so that such a melting point is preferable.

The melt flow rate (MFR, ASTM D1238 65T, 230° C., load of 2.16 kg) of the polypropylene (C) is in the range of usually 0.01 to 100 g/10 min, preferably 0.05 to 70 g/10 min.

Although the process for preparing the polypropylene (C) for use in the present invention (1) is not specifically restricted, the polypropylene (C) can be prepared by a hitherto publicly known process.

The polypropylene (C) for use in the present invention (1) is contained in an amount of 10 to 40% by weight, preferably 12 to 38% by weight, more preferably 14 to 36% by weight, in 100% by weight of the total of the components (A), (B), (C), (D) and (E-a).

The polypropylene (C) for use in the present invention (1) preferably contains polypropylene (c) having a melt tension value, at 190° C., of not less than 3 g.

The melt tension is measured using a capillary rheometer under the conditions of an extrusion temperature of 190° C., an extrusion rate of 10 mm/min, an extrusion nozzle diameter of 2.095 mm, a nozzle length of 8 mm and a take-off rate of 4 m/min.

The polypropylene (c) having a melt tension value, at 190° C., of not less than 3 g is, for example, polypropylene of a wide molecular weight distribution type partially containing a high-molecular weight component, polypropylene containing a long-chain branched component due to electron ray crosslinking, or polypropylene containing partially crosslinked polypropylene. Taking into account foaming properties, appearance and recycling properties of the resulting molded product, polypropylene of a wide molecular weight distribution type partially containing a high-molecular weight component is preferable among them. This high-molecular weight component has an intrinsic viscosity [η] of usually 3 to 15 dl/g, preferably 4 to 14 dl/g, more preferably 5 to 13 dl/g, and is contained in an amount of usually 1 to 49% by weight, preferably 3 to 45% by weight, more preferably 5 to 40% by weight, in the polypropylene (c).

The molecular weight distribution (Mw/Mn) of the polypropylene (c) having a melt tension value, at 190° C., of not less than 3 g is in the range of usually 5 to 20, preferably 6 to 18, more preferably 7 to 15.

The melt flow rate (MFR, ASTM D1238 65T, 230° C., load of 2.16 kg) of the polypropylene (c) having a melt tension value, at 190° C., of not less than 3 g is in the range of usually 0.01 to 100 g/10 min, preferably 0.05 to 50 g/10 min.

The polypropylene (c) having a melt tension value, at 190° C., of not less than 3 g is contained in an amount of usually 1 to 50 parts by weight, preferably 3 to 45 parts by weight, more preferably 5 to 40 parts by weight, in 100 parts by weight of the polypropylene (C).

Softener (D) for Rubbers

As the softener (D) for rubbers for use in the present invention (1), a softener usually used for rubbers is used. Examples of such softeners include petroleum-based substances, such as process oil, lubricating oil, paraffin, liquid paraffin, petroleum asphalt and vaseline; synthetic oils, such as a low-molecular weight ethylene/α-olefin random copolymer; coal tars, such as coal tar and coal tar pitch; fatty oils, such as castor oil, linseed oil, rapeseed oil, soybean oil and coconut oil; waxes, such as tall oil, beeswax, carnauba wax and lanoline; fatty acids and their metal salts, such as ricinolic acid, palmitic acid, stearic acid, barium stearate and calcium stearate; synthetic high-molecular substances, such as petroleum resin, coumarone-indene resin and atactic polypropylene; ester-based plasticizers, such as dioctyl phthalate, dioctyl adipate and dioctyl sebacate; and other substances, such as microcrystalline wax, rubber substitute (factice), liquid polybutadiene, modified liquid polybutadiene and liquid Thiokol. Of these, paraffin-based process oil and a low-molecular weight ethylene/α-olefin random copolymer are particularly preferable, and of these, paraffin-based process oil of high viscosity type having a low content of a low-molecular weight component that easily volatilizes is particularly preferable. The "high-viscosity type" means one having a kinematic viscosity, at 40° C., of 100 to 10000 centistokes.

For adding the softener (D) for rubbers in the preparation of the thermoplastic elastomer composition for foaming of the present invention (1), the softener (D) for rubbers may be directly poured into the extruder in the preparation of the thermoplastic elastomer composition for foaming, or may be used after it is oil-extended in the ethylene/α-olefin/non-conjugated polyene copolymer rubber (A).

The softener (D) for rubbers for use in the present invention (1) is contained in an amount of 10 to 45% by weight, preferably 12 to 43% by weight, more preferably 15 to 40% by weight, in 100% by weight of the total of the components (A), (B), (C), (D) and (E-a).

Isotactic Propylene-Based Polymer (E-a)

The isotactic propylene-based polymer (E-a) for use in the present invention (1) satisfies the following requirements (i) to (iv).

(i) The molecular weight distribution (Mw/Mn), as measured by gel permeation chromatography (GPC), is in the range of 1 to 10.

(ii) The amount of constitutional units derived from propylene is in the range of 40 to 85% by mol and the amount of constitutional units derived from an α-olefin of 2 to 20 carbon atoms (other than propylene) is in the range of 60 to 15% by mol, with the proviso that the total amount of the propylene units and the units of the α-olefin of 2 to 20 carbon atoms is 100% by mol.

(iii) The melt flow rate (MFR, ASTM D1238, 190° C., load of 2.16 kg) is in the range of 0.1 to 50 g/10 min.

(iv) A melting point, as determined by differential scanning calorimetry (DSC), is not observed. Observation of a melting point is carried out when the sample is held at 200° C. for 5 minutes, then cooled down to −20° C. at a cooling rate of −20° C./min and heated again up to 180° C. at a heating rate of 20° C./min, and the expression "melting point is not observed" means that a crystal melting peak the amount of heat of crystal fusion of which is not less than 1 J/g is not observed.

The isotactic propylene-based polymer (E-a) for use in the present invention (1) more preferably satisfies the following requirements (i') to (iv').

(i') The molecular weight distribution (Mw/Mn), as measured by gel permeation chromatography (GPC), is in the range of 1 to 3.

(ii') The amount of constitutional units derived from propylene is in the range of 40 to 85% by mol, the amount of constitutional units derived from ethylene is in the range of 5 to 30% by mol, and the amount of constitutional units derived from an α-olefin of 4 to 20 carbon atoms is in the range of 5 to 30% by mol, with the proviso that the total amount of the propylene units, the ethylene units and the units of the α-olefin of 4 to 20 carbon atoms is 100% by mol.

Of the above requirements, a preferred embodiment of the requirement (ii') is that the amount of constitutional units derived from propylene is in the range of 60 to 82% by mol, preferably 61 to 75% by mol, the amount of constitutional units derived from ethylene is in the range of 8 to 15% by mol, preferably 10 to 14% by mol, and the amount of constitutional units derived from an α-olefin of 4 to 20 carbon atoms is in the range of 10 to 25% by mol, preferably 15 to 25% by mol, with the proviso that the total amount of the constitutional units derived from propylene, the constitutional units derived from ethylene and the constitutional units derived from the α-olefin of 4 to 20 carbon atoms is 100% by mol.

(iii') The melt flow rate (MFR, ASTM D1238, 190° C., load of 2.16 kg) is in the range of 0.1 to 50 g/10 min.

(iv') A melting point, as determined by differential scanning calorimetry (DSC), is not observed.

The isotactic propylene-based polymer (E-a) preferably further satisfies at least one of the following requirements (v') and (vi'), preferably both of them, in addition to the above requirements (i') to (iv').

(v') The Shore A hardness is in the range of usually 0 to 80, preferably 35 to 60.

(vi') The crystallinity, as measured by X-ray diffractometry, is usually not more than 20%, preferably not more than 10%.

The isotactic propylene-based polymer (E-a) is a homopolymer of propylene, and/or a random copolymer of propylene and an α-olefin of 2 to 20 carbon atoms (other than propylene). Examples of the α-olefins of 2 to 20 carbon atoms include ethylene, 1-butene, 1-hexene, 4-methyl-1-pentene and 1-octene. Of these, ethylene and α-olefins of 4 to 20 carbon atoms are preferable, and ethylene and 1-butene are particularly preferable.

The isotactic propylene-based polymer (E-a) is obtained by polymerizing propylene or propylene and other α-olefins using a publicly known stereoregular catalyst, and in particular, a copolymer obtained by the use of a metallocene catalyst is preferable because the resulting molded product has little surface tackiness. In this case, the molecular weight distribution (Mw/Mn), as determined by gel permeation chromatography (GPC), is in the range of 1 to 3.

The process for preparing the isotactic propylene-based polymer (E-a) is described in, for example, International Publication No. 2004/87775 Pamphlet.

The isotactic propylene-based polymer (E-a) for use in the present invention (1) is contained in an amount of 1 to 30% by weight, preferably 1.2 to 28% by weight, more preferably 1.5 to 25% by weight, in 100% by weight of the total of the components (A), (B), (C), (D) and (E-a).

Hydrogenated Conjugated Diene Polymer (F)

The thermoplastic elastomer composition for foaming of the present invention (1) may contain a hydrogenated conjugated diene polymer (F). The hydrogenated conjugated diene polymer (F) is contained in an amount of preferably 1 to 30 parts by weight, more preferably 2 to 28 parts by weight, particularly preferably 3 to 25 parts by weight, based on 100 parts by weight of the total of the components (A), (B), (C), (D) and (E-a).

Details of the hydrogenated conjugated diene polymer (F) are described in the later-described present invention (2).

Other Components

To the thermoplastic elastomer composition for foaming of the present invention (1), additives, such as hitherto publicly known inorganic filler, heat stabilizer, anti-aging gent, weathering stabilizer, antistatic agent, crystal nucleating agent and lubricant, may be added within limits not detrimental to the object of the present invention (1).

Examples of the inorganic fillers include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bulb, Shirasu balloon, basic magnesium sulfate whisker, calcium titanate whisker and aluminum borate whisker.

Examples of the lubricants include higher fatty acid amides, metallic soaps, waxes, silicone oils and fluorine-based polymers. Of these, higher fatty acid amides, silicone oils and fluorine-based polymers are preferable. The lubricant exerts an effect of improving moldability of the thermoplastic elastomer composition for foaming.

Examples of the higher fatty acid amides include saturated fatty acid amides, such as lauric acid amide, palmitic acid amide, stearic acid amide and behemic acid amide; unsaturated fatty acid amides, such as erucic acid amide, oleic acid amide, brassidic acid amide and elaidic acid amide; and bis-fatty acid amides, such as methylenebisstearic acid amide, methylenebisoleic acid amide, ethylenebisstearic acid amide and ethylenebisoleic acid amide.

Examples of the silicone oils include dimethyl silicone oil, phenylmethyl silicone oil, alkyl silicone oil, fluorosilicone oil, tetramethyltetraphenyltrisiloxane and modified silicone oil.

Examples of the fluorine-based polymers include polytetrafluoroethylene and a vinylidene fluoride copolymer.

Thermoplastic Elastomer Composition for Foaming

The thermoplastic elastomer composition for foaming of the present invention (1) can be prepared by melt kneading the partially or completely crosslinked ethylene/α-olefin/non-conjugated polyene copolymer rubber (A), the ethylene/α-olefin copolymer (B), the polypropylene (C), the softener (D) for rubbers, the isotactic propylene-based polymer (E-a), etc.

As the kneading apparatus, a mixing roll, an intensive mixer (e.g., Banbury mixer, kneader), a single screw or twin-screw extruder or the like can be used, and a non-open type apparatus is preferable.

Thermoplastic Elastomer Molded Foam

The thermoplastic elastomer molded foam (also referred to as a "molded foam" simply hereinafter) of the present invention (1) is obtained by molding the above thermoplastic elastomer composition for foaming.

It is preferable that a blowing agent (H) is added to the thermoplastic elastomer composition for foaming, when needed, followed by foaming the composition. Examples of the blowing agents (H) include an inorganic or organic thermal decomposition type blowing agent (chemical blowing agent), carbon dioxide, nitrogen, and a mixture of carbon dioxide and nitrogen.

Examples of the inorganic thermal decomposition type blowing agents include carbonates, such as sodium hydrogencarbonate, sodium carbonate, ammonium hydrogencarbonate and ammonium carbonate, and nitrites, such as ammonium nitrite.

Examples of the organic thermal decomposition type blowing agents include nitroso compounds, such as N,N'-dimethyl-N,N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonyl hydrazide compounds, such as benzenesulfonyl hydrazide, toluenesulfonyl hydrazide, p,p'-oxybis(benzenesulfonyl hydrazide) and diphenylsulfone-3,3'-disulfonyl hydrazide; and azide compounds, such as calcium azide, 4,4'-diphenyl disulfonyl azide and p-toluenesulfonyl azide.

When carbon dioxide or nitrogen is used, the thermoplastic elastomer composition for foaming is melted at 100 to 300° C. in a resin plasticating cylinder to form a molten foamable thermoplastic elastomer composition in which the thermoplastic elastomer composition for foaming and carbon dioxide or nitrogen are compatible with each other.

The blowing agent (H) is used in an amount of usually 0.5 to 30 parts by weight, preferably 1 to 20 parts by weight, based on 100 parts by weight of the thermoplastic elastomer composition for foaming.

Moreover, a blowing aid may be added, when needed. The amount of the blowing aid added is in the range of usually 0.01 to 10 parts by weight, preferably 0.02 to 5 parts by weight, based on 100 parts by weight of the thermoplastic elastomer composition for foaming.

Examples of the blowing aids include compounds of metals such as zinc, calcium, lead, iron and barium, higher fatty acids and metal salts thereof, such as stearic acid, and inorganic fine particles, such as talc, barium sulfate and silica. More specifically, there can be mentioned mixtures of polyvalent carboxylic acids, such as citric acid, oxalic acid, fumaric acid, phthalic acid, malic acid, tartaric acid, lactic acid, cyclohexane-1,2-dicarboxylic acid, camphoric acid, ethylenediaminetetraacetic acid, triethylenetetraminehexaacetic acid and nitrilo acid, and inorganic carbonic acid compounds, such as sodium hydrogencarbonate, sodium aluminum hydrogencarbonate and potassium hydrogencarbonate, intermediate products formed by the reaction of them, e.g., salts of polycarboxylic acids, such as sodium dihydrogencitrate and potassium oxalate.

The blowing aid has functions of lowering of decomposition temperature of the blowing agent, acceleration of decomposition, formation of foam nucleus, making cells uniform, etc., so that use of the blowing aid is desirable if it is possible. Especially when a blowing aid that is decomposed at the extrusion temperature in the formation of raw material pellets or a temperature in the vicinity of the melting temperature of the foam, an effect of uniformly forming foam cells of small diameters is exerted.

It is particularly preferable that the thermoplastic elastomer composition for foaming of the present invention (1) is foamed using an inorganic or organic thermal decomposition type blowing agent, and as a blowing aid, a mixture of a polyvalent carboxylic acid and an inorganic carbonic acid compound among the above blowing aids, specifically a mixture of citric acid and sodium hydrogencarbonate, or disodium citrate that is a reaction intermediate product thereof.

The blowing agent or the blowing aid may be dry blended prior to injection molding so as to be decomposed in the injection molding, or may be added after it is melt blended with pellets.

The process for preparing a molded foam from the thermoplastic elastomer composition for foaming of the present invention (1) is not specifically restricted, and the molded foam can be prepared by extrusion method, press molding, injection molding, blow molding, extrusion blow molding, injection blow molding, inflation method, stamping, compression molding, bead molding or the like using a molding machine that is used for publicly known resin processing.

As an example of the process, a process for preparing a molded foam by extrusion method using, as a blowing agent, carbon dioxide that is in a supercritical state is given below. That is to say, the thermoplastic elastomer composition for foaming of the present invention (1) is melted in an extruder, then carbon dioxide is heated to not lower than the critical temperature (31° C.) of carbon dioxide at a pressure of critical pressure range (7.4 to 40 MPa) to give supercritical carbon dioxide, and the supercritical carbon dioxide is mixed with the molten thermoplastic elastomer composition in the extruder. Subsequently, the thermoplastic elastomer composition mixed with the supercritical carbon dioxide is transferred to a die connected to the tip of the extruder preset at an optimum blowing temperature, and extruded from the die into the atmosphere to abruptly lower the pressure, whereby carbon dioxide is gasified to foam the composition. The composition thus foamed is cooled with the succeeding cooling device and solidified to obtain a desired molded foam. The temperature of the thermoplastic elastomer composition during the extrusion is desirably set in the range of 110 to 250° C.

As another example, a process for preparing a molded foam by press molding is given below. That is to say, the aforesaid chemical blowing agent and pellets of the thermoplastic elastomer composition for foaming are placed in a heated mold of a press molding machine, and the thermoplastic elastomer composition is melted with or without applying a mold pressure and then foamed to produce a molded foam. In this case, the temperature of the mold is preferably set in the range of 110 to 250° C.

As a further example, a process for preparing a molded foam by injection molding is given below. That is to say, the thermoplastic elastomer composition for foaming is heated and melted by an injection molding machine and then injected into a mold so as to be foamed at the nozzle tip, whereby a molded foam is produced. The resin temperature during the injection is preferably in the range of 110 to 250° C.

Since the thermoplastic elastomer composition for foaming of the present invention (1) has high fluidity, it is desirable to produce a molded foam by injection molding. Moreover, the following injection foam molding by core back process is preferable. That is to say, the thermoplastic elastomer composition for foaming is injected into a cavity of an injection mold that is in a closed state. After the injection is completed, a moving core is moved with maintaining contact with the mold wall surface by virtue of expansion of the resin due to the blowing gas and stopped at the position of a predetermined reference wall thickness to perform molding. After cooling of the mold is completed, the moving core is moved backward to take out the product, whereby a molded foam is obtained.

The molded foam of the present invention (1) may be laminated onto an olefin-based resin substrate in accordance with, for example, the following embodiments 1 to 3.

Embodiment 1

Molding method: calendering or T-die extrusion foam molding

Laminating method: successive method comprising producing a sheet of a polyolefin-based resin substrate layer by foam molding and then laminating a surface layer onto the substrate layer is carried out, or in the case of T-die extrusion method, simultaneous multi-layer extrusion foam molding is carried out.

Embodiment 2

Molding method: multi-layer extrusion foam molding

Laminating method: simultaneous multi-layer extrusion foam molding for a polyolefin-based resin substrate layer and a surface layer is carried out.

Embodiment 3

Molding method: successive or simultaneous injection foam molding

Laminating method: successive injection foam molding method comprising producing a polyolefin-based resin substrate layer by injection foaming and then injecting a thermoplastic elastomer composition for foaming that gives a surface layer, to laminate them in the mold is carried out, or simultaneous method comprising simultaneously injecting a substrate layer and a surface layer by so-called sandwich molding and foaming the laminate is carried out.

Although the laminating methods of the above embodiments 1 to 3 can be considered, it is preferable that a composite molded product obtained by laminating the molded foam of the present invention (1) onto a polyolefin-based resin substrate is used for an instrument panel for automobile.

In this case, it is preferable to carry out the following molding methods.

Two-Color Molding Method

In the two-color molding method, a polyolefin-based resin substrate is produced, and subsequently injection foam molding is carried out, whereby a composite molded product in which the polyolefin-based resin substrate is bonded to the thermoplastic elastomer molded foam of the present invention (1) is obtained.

Insert Molding Method

In the insert molding method, a polyolefin-based resin substrate is produced in advance and placed in an injection mold, and then injection foam molding is carried out, whereby a composite molded product in which the polyolefin-based resin substrate is bonded to the injection molded foam is obtained. By using a polypropylene-based resin for the polyolefin-based resin substrate, better bond properties are obtained.

Next, the present invention (2) is described in detail.

Partially or Completely Crosslinked Ethylene/α-Olefin/Non-Conjugated Polyene Copolymer Rubber (A) Comprising Ethylene, α-Olefin of 3 to 20 Carbon Atoms and Non-Conjugated Polyene The partially or completely crosslinked ethylene/α-olefin/non-conjugated polyene copolymer rubber (A) for use in the present invention (2) is a rubber obtained by partially or completely crosslinking a copolymer rubber comprising ethylene, an α-olefin of 3 to 20 carbon atoms and a non-conjugated polyene.

Examples of the α-olefins of 3 to 20 carbon atoms include propylene, 1-butene, 4-methylpentene-1,1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-1,1'-methyldodecene-1 and 12-ethyltetradecene-1. Of these, propylene, 1-butene, 4-methylpentene-1,1-hexene and 1-octene are preferable, and propylene is particularly preferable.

These α-olefins are used singly or in combination of two or more kinds.

Examples of the non-conjugated polyenes include chain non-conjugated dienes, such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecadiene; cyclic non-conjugated dienes, such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes, such as 2,3-diisopropylidene-5-norbornene, 2-ethylidene-3-isopropylidene-5-norbornene, 2-propenyl-2,2-norbornadiene and 4-ethylidene-8-methyl-1,7-nonadiene. Of these, 5-ethylidene-2-norbornene and 5-vinyl-2-norbornene are preferable.

These non-conjugated polyenes are used singly or in combination of two or more kinds.

The partially or completely crosslinked ethylene/α-olefin/non-conjugated polyene copolymer rubber (A) for use in the present invention (2) contains constitutional units (a) derived from ethylene and constitutional units (b) derived from an α-olefin of 3 to 20 carbon atoms in a molar ratio of usually 40/60 to 95/5, preferably 60/40 to 80/20, more preferably 65/35 to 75/25.

If necessary, another ethylene/α-olefin copolymer rubber may be blended.

Examples of the α-olefins to constitute another ethylene/α-olefin copolymer rubber include the same α-olefins as those for constituting the ethylene/α-olefin/non-conjugated polyene copolymer rubber. The copolymer rubber contains constitutional units derived from ethylene in an amount of usually not less than 50% by mol, preferably 50 to 90% by mol, more preferably 60 to 85% by mol, and contains constitutional units derived from an α-olefin of 3 to 20 carbon atoms in an amount of usually not more than 50% by mol, preferably 50 to 10% by mol, more preferably 40 to 15% by mol, with the proviso that the total amount of the ethylene units and the α-olefin units is 100% by mol.

The iodine value that is an indication for measuring the amount of the non-conjugated polyene component in the partially or completely crosslinked ethylene/α-olefin/non-conjugated polyene copolymer rubber (A) for use in the present invention (2) is in the range of usually 1 to 50, preferably 5 to 40, more preferably 10 to 30. That is to say, the non-conjugated diene units are contained in an amount of 2 to 20% by weight in 100% by weight of the total of the ethylene units, the units of the α-olefin of 3 to 20 carbon atoms and the non-conjugated polyene units.

The partially or completely crosslinked ethylene/α-olefin/non-conjugated polyene copolymer rubber (A) for use in the present invention (2) has an intrinsic viscosity [η], as measured in decalin at 135° C., of usually 1.0 to 10.0 dl/g, preferably 1.5 to 8.0 dl/g, and a Mooney viscosity [$ML_{1+4}$ (100° C.)] of usually 10 to 250, preferably 30 to 150.

The partially or completely crosslinked ethylene/α-olefin/non-conjugated polyene copolymer rubber (A) for use in the present invention (2) can be prepared by a hitherto publicly known process.

The partially or completely crosslinked ethylene/α-olefin/non-conjugated polyene copolymer rubber (A) for use in the present invention (2) is a rubber obtained by partially or completely crosslinking the above ethylene/α-olefin/non-conjugated polyene copolymer rubber. Examples of crosslinking agents include organic peroxides, sulfur, sulfur compounds, and phenol-based vulcanizing agents such as a phenolic resin. Preferable are organic peroxides.

Examples of the organic peroxides include dicumyl peroxide, di-t-butyl peroxide, 2,5-dimethyl-2,5-di(t-butylperoxy)hexane, 2,5-dimethyl-2,5-di(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butyl perbenzoate, t-butyl peroxyisopropyl carbonate, diacetyl peroxide, lauroyl peroxide and t-butyl cumyl peroxide. From the viewpoints of odor and scorch stability, 2,5-dimethyl-2,5-di(t-butylperoxy)hexane, 2,5-dimethyl-2,5-di(t-butylperoxy)hexyne-3,1,3-bis(t-butylperoxyisopropyl)benzene, 1,1-bis(t-butylperoxy)-3,3,5-trimethylcyclohexane and n-butyl-4,4-bis(t-butylperoxy)valerate are preferable among them, and 1,3-bis(t-butylperoxyisopropyl)benzene is particularly preferable.

Such an organic peroxide is used in an amount of usually 0.02 to 3 parts by weight, preferably 0.05 to 1 part by weight, based on 100 parts by weight of the partially or completely crosslinked ethylene/α-olefin/non-conjugated polyene copolymer rubber (A).

In the crosslinking using the organic peroxide, crosslinking assistants, such as sulfur, p-quinonedioxime, p,p'-dibenzoyl quinonedioxime, N-methyl-N,4-dinitrosoaniline, nitrobenzene, diphenylquanidine and trimethylolpropane-N,N'-m-phenylenedimaleimide, divinylbenzene, triallyl cyanurate, polyfunctional methacrylate monomers, such as ethylene glycol dimethacrylate, diethylene glycol dimethacrylate, polyethylene glycol dimethacrylate, trimethylolpropane trimethacrylate and allyl methacrylate, and polyfunctional vinyl monomers, such as vinyl butyrate and vinyl stearate, may be incorporated. By incorporating such compounds, uniform and mild crosslinking reaction can be expected.

The above compound, such as a crosslinking assistant or a polyfunctional vinyl monomer, is used in an amount of usually not more than 5 parts by weight, preferably 0.3 to 3 parts by weight, based on 100 parts by weight of the partially or completely crosslinked ethylene/α-olefin/non-conjugated polyene copolymer rubber (A).

The dynamic heat treatment is preferably carried out in a non-open type apparatus, and is preferably carried out in an atmosphere of an inert gas such as nitrogen or carbonic acid gas. The temperature of the heat treatment is in the range of the melting point of the other thermoplastic resin (B) to 300° C., and is in the range of usually 150 to 290° C., preferably 170 to 270° C. The kneading time is in the range of usually 1 to 20 minutes, preferably 1 to 10 minutes. The shear force applied is in the range of usually 10 to 100,000 $sec^{-1}$, preferably 100 to 50,000 $sec^{-1}$, in terms of shear rate.

In order to accelerate decomposition of the organic peroxide, decomposition accelerators, e.g., tertiary amines, such as triethylamine, tributylamine and 2,4,6-tri(dimethylamino)

phenol, and naphthenates of aluminum, cobalt, vanadium, copper, calcium, zirconium, manganese, magnesium, lead, mercury and the like, may be used.

Although the crosslinking method is not specifically restricted, crosslinking can be carried out by dynamically heat-treating the ethylene/α-olefin/non-conjugated polyene copolymer rubber in the presence or absence of a crosslinking agent. The expression "dynamically heat-treating" means kneading in a molten state.

The ethylene/α-olefin/non-conjugated polyene copolymer rubber (A) may be a rubber prepared by adding the later-described polypropylene (C) to the ethylene/α-olefin/non-conjugated polyene copolymer rubber in advance and dynamically heat-treating the mixture together with the softener (D) for rubbers and other additives.

The partially or completely crosslinked ethylene/α-olefin/non-conjugated polyene copolymer rubber (A) for use in the present invention (2) is contained in an amount of 10 to 40% by weight, preferably 12 to 38% by weight, more preferably 14 to 36% by weight, in 100% by weight of the total of the components (A), (B), (C), (D) and (E-b).

When the later-described isotactic propylene-based polymer (E-a) is contained, the ethylene/α-olefin/non-conjugated polyene copolymer rubber (A) is contained in an amount of 10 to 40% by weight, preferably 12 to 38% by weight, more preferably 14 to 36% by weight, in 100% by weight of the total of the components (A), (B), (C), (D), (E-a) and (E-b).

Ethylene/α-Olefin Copolymer (B) Comprising Ethylene and α-Olefin of 3 to 20 Carbon Atoms The ethylene/α-olefin copolymer (B) for use in the present invention (2) is a non-crosslinked rubber comprising ethylene and an α-olefin of 3 to 20 carbon atoms.

Examples of the α-olefins of 3 to 20 carbon atoms include propylene, 1-butene, 4-methylpentene-1,1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-1,11-methyldodecene-1 and 12-ethyltetradecene-1. Of these, propylene, 1-butene, 4-methylpentene-1,1-hexene and 1-octene are preferable, and propylene and 1-butene are more preferable.

These α-olefins are used singly or in combination of two or more kinds.

The ethylene/α-olefin copolymer (B) contains constitutional units (a) derived from ethylene and constitutional units (b) derived from an α-olefin of 3 to 20 carbon atoms in a molar ratio of usually 50/50 to 98/2, preferably 60/40 to 95/5, more preferably 65/35 to 90/5.

The ethylene/α-olefin copolymer (B) may contain a non-conjugated polyene, when needed. Examples of the non-conjugated polyenes include chain non-conjugated dienes, such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecadiene; cyclic non-conjugated dienes, such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes, such as 2,3-diisopropylidene-5-norbornene, 2-ethylidene-3-isopropylidene-5-norbornene, 2-propenyl-2,2-norbornadiene and 4-ethylidene-8-methyl-1,7-nonadiene. Of these, 5-ethylidene-2-norbornene and 5-vinyl-2-norbornene are preferable. These non-conjugated polyenes are used singly or in combination of two or more kinds.

When the non-conjugated polyene is contained, non-conjugated polyene units are contained in an amount of 2 to 20% by weight in 100% by weight of the total of the ethylene units, the units of the α-olefin of 3 to 20 carbon atoms and the non-conjugated polyene units.

The iodine value that is an indication for measuring the amount of the non-conjugated polyene component is in the range of usually 1 to 50, preferably 5 to 40, more preferably 10 to 30.

The ethylene/α-olefin copolymer (B) has MFR of usually 0.1 to 500 g/10 min, preferably 0.3 to 200 g/10 min, and an intrinsic viscosity [α], as measured in decalin at 135° C., of usually 0.2 to 5.0 dl/g, preferably 0.5 to 3.0 dl/g.

When the ethylene/α-olefin copolymer (B) contains constitutional units derived from the non-conjugated polyene, the Mooney viscosity [$ML_{1+4}$ (100° C.)] of the ethylene/α-olefin copolymer (B) is in the range of usually 1 to 100, preferably 3 to 70.

The ethylene/α-olefin copolymer (B) can be prepared by a hitherto publicly known process.

The ethylene-based rubber (B) is contained in an amount of 3 to 33% by weight, preferably 5 to 30% by weight, more preferably 7 to 28% by weight, in 100% by weight of the total of the components (A), (B), (C), (D) and (E-b).

When the later-described isotactic propylene-based polymer (E-a) is contained, the ethylene-based rubber (B) is contained in an amount of 3 to 33% by weight, preferably 5 to 30% by weight, more preferably 7 to 28% by weight, in 100% by weight of the total of the components (A), (B), (C), (D), (E-a) and (E-b).

Polypropylene (C)

The polypropylene (C) for use in the present invention (2) is a polymer obtained by using propylene as a main component. The polypropylene (C) for use in the present invention (2) is a propylene homopolymer or a copolymer of propylene and a small amount of an α-olefin of 2 to 20 carbon atoms (other than propylene), and contains propylene units in an amount of not less than 50% by mol, preferably not less than 60% by mol, in 100% by mol of the total of the propylene units and the units of the α-olefin of 2 to 20 carbon atoms (other than propylene).

Examples of the polypropylenes (C) include a propylene homopolymer, a propylene/ethylene block copolymer, a propylene/ethylene random copolymer and a propylene/ethylene/1-butene random copolymer. Taking heat resistance, etc. into account, a propylene homopolymer or a propylene/ethylene block copolymer is preferable among them.

The polypropylene (C) may be one having an isotactic structure, may be one having a syndiotactic structure or may be a blend of them.

The polypropylene (C) has a melting point, as determined by differential scanning calorimetry (DSC), of 40 to 170° C., preferably 50 to 167° C., more preferably 60 to 165° C. Measurement of the melting point by DSC is carried out when the sample is held at 200° C. for 5 minutes, then cooled down to −20° C. at a cooling rate of −20° C./min and heated again up to 180° C. at a heating rate of 20° C./min. When the melting point of the polypropylene (C) is in the above range, sufficient heat resistance is obtained, so that such a melting point is preferable.

The melt flow rate (MFR, ASTM D1238 65T, 230° C., load of 2.16 kg) of the polypropylene (C) is in the range of usually 0.01 to 100 g/10 min, preferably 0.05 to 70 g/10 min.

Although the process for preparing the polypropylene (C) is not specifically restricted, the polypropylene (C) can be prepared by a hitherto publicly known process.

The polypropylene (C) is contained in an amount of 10 to 40% by weight, preferably 12 to 38% by weight, more preferably 14 to 36% by weight, in 100% by weight of the total of the components (A), (B), (C), (D) and (E-b).

When the later-described isotactic propylene-based polymer (E-a) is contained, the polypropylene (C) is contained in an amount of 10 to 40% by weight, preferably 12 to 38% by weight, more preferably 14 to 36% by weight, in 100% by weight of the total of the components (A), (B), (C), (D), (E-a) and (E-b).

The polypropylene (C) preferably contains polypropylene (c) having a melt tension value, at 190° C., of not less than 3 g.

The melt tension is measured using a capillary rheometer under the conditions of an extrusion temperature of 190° C., an extrusion rate of 10 mm/min, an extrusion nozzle diameter of 2.095 mm, a nozzle length of 8 mm and a take-off rate of 4 m/min.

The polypropylene (c) having a melt tension value, at 190° C., of not less than 3 g is, for example, polypropylene of a wide molecular weight distribution type partially containing a high-molecular weight component, polypropylene containing a long-chain branched component due to electron ray crosslinking, or polypropylene containing partially crosslinked polypropylene. Taking into account foaming properties, appearance and recycling properties of the resulting molded product, polypropylene of a wide molecular weight distribution type partially containing a high-molecular weight component is preferable among them. This high-molecular weight component has an intrinsic viscosity $[\eta]$ of usually 3 to 15 dl/g, preferably 4 to 14 dl/g, more preferably 5 to 13 dl/g, and is contained in an amount of usually 1 to 49% by weight, preferably 3 to 45% by weight, more preferably 5 to 40% by weight, in the polypropylene (c).

The molecular weight distribution (mw/Mn) of the polypropylene (c) having a melt tension value, at 190° C., of not less than 3 g is in the range of usually 5 to 20, preferably 6 to 18, more preferably 7 to 15.

The melt flow rate (MFR, ASTM D1238 65T, 230° C., load of 2.16 kg) of the polypropylene (c) having a melt tension value, at 190° C., of not less than 3 g is in the range of usually 0.01 to 100 g/10 min, preferably 0.05 to 50 g/10 min.

The polypropylene (c) having a melt tension value, at 190° C., of not less than 3 g is contained in an amount of usually 1 to 50 parts by weight, preferably 3 to 45 parts by weight, more preferably 5 to 40 parts by weight, in 100 parts by weight of the polypropylene (C).

Softener (D) for Rubbers

As the softener (D) for rubbers for use in the present invention (2), a softener usually used for rubbers is used. Examples of such softeners include petroleum-based substances, such as process oil, lubricating oil, paraffin, liquid paraffin, petroleum asphalt and vaseline; synthetic oils, such as a low-molecular weight ethylene/α-olefin random copolymer; coal tars, such as coal tar and coal tar pitch; fatty oils, such as castor oil, linseed oil, rapeseed oil, soybean oil and coconut oil; waxes, such as tall oil, beeswax, carnauba wax and lanoline; fatty acids and their metal salts, such as ricinolic acid, palmitic acid, stearic acid, barium stearate and calcium stearate; synthetic high-molecular substances, such as petroleum resin, coumarone-indene resin and atactic polypropylene; ester-based plasticizers, such as dioctyl phthalate, dioctyl adipate and dioctyl sebacate; and other substances, such as microcrystalline wax, rubber substitute (factice), liquid polybutadiene, modified liquid polybutadiene and liquid Thiokol. Of these, paraffin-based process oil and a low-molecular weight ethylene/α-olefin random copolymer are particularly preferable, and of these, paraffin-based process oil of high viscosity type having a low content of a low-molecular weight component that easily volatilizes is particularly preferable. The "high-viscosity type" means one having a kinematic viscosity, at 40° C., of 100 to 10000 centistokes.

For adding the softener (D) for rubbers in the preparation of the thermoplastic elastomer composition for foaming of the present invention (2), the softener (D) for rubbers may be directly poured into the extruder in the preparation of the thermoplastic elastomer composition for foaming, or may be used after it is oil-extended in the ethylene/α-olefin/non-conjugated polyene copolymer rubber (A).

The softener (D) for rubbers for use in the present invention (2) is contained in an amount of 10 to 45% by weight, preferably 12 to 43% by weight, more preferably 15 to 40% by weight, in 100% by weight of the total of the components (A), (B), (C), (D) and (E-b).

When the later-described isotactic propylene-based polymer (E-a) is contained, the softener (D) for rubbers is contained in an amount of 10 to 45% by weight, preferably 12 to 43% by weight, more preferably 15 to 40% by weight, in 100% by weight of the total of the components (A), (B), (C), (D), (E-a) and (E-b).

Syndiotactic α-Olefin-Based Copolymer (E-b)

The syndiotactic α-olefin-based copolymer (E-b) for use in the present invention (2) contains constitutional units (E-1) derived from propylene, constitutional units (E-2) derived from ethylene, constitutional units (E-3) derived from an α-olefin of 4 to 20 carbon atoms, and if necessary, constitutional units (E-4) derived from a conjugated polyene or a non-conjugated polyene, in specific proportions, and is characterized in that when $^{13}$C-NMR of the component (E-b) is measured in a 1,2,4-trichlorobenzene solution using tetramethylsilane as a reference material, the sum total of absorptions of methyl groups of propylene units (also referred to as "propylene methyl groups" simply hereinafter) observed at about 20.0 to 21.0 ppm is not less than 0.5 time the sum total of absorptions of methyl groups of propylene units observed at about 19.0 to 22.0 ppm, and the component (E-b) has a substantially syndiotactic structure.

As for the syndiotactic α-olefin-based copolymer (E-b), when $^{13}$C-NMR of the component (E-b) is measured in a 1,2,4-trichlorobenzene solution using tetramethylsilane as a reference material, the sum total of absorptions of propylene methyl groups observed at about 20.0 to 21.0 ppm is preferably not less than 0.6 time, more preferably not less than 0.7 time, the sum total of absorptions of propylene methyl groups observed at about 19.0 to 22.0 ppm.

The expression "has a substantially syndiotactic structure" in the present invention (2) means that the sum total of absorptions of propylene methyl groups in the syndiotactic α-olefin-based copolymer (E-b) is in the above range.

This syndiotactic structure is measured in the following manner. That is to say, 0.35 g of a sample is dissolved in 2.0 ml of hexachlorobutadiene by heating. After the resulting solution is filtered through a glass filter (G2), 0.5 ml of deuterated benzene is added, and the mixture is introduced into an NMR tube having an inner diameter of 10 mm. Then, using a JEOL GX-500 model NMR measuring device, $^{13}$C-NMR measurement is carried out at 120° C. The number of times of integration is 10,000 or more.

The syndiotactic α-olefin-based copolymer (E-b) for use in the present invention (2) contains the propylene units (E-1) in an amount of 30 to 79% by mol, the ethylene units (E-2) in an amount of 1 to 30% by mol and the units (E-3) of the α-olefin of 4 to 20 carbon atoms in an amount of 10 to 50% by mol, with the proviso that the total amount of the propylene units (E-1), the ethylene units (E-2) and the units (E-3) of the α-olefin of 4 to 20 carbon atoms is 100% by mol and the total amount of the ethylene units (E-2) and the units (E-3) of the α-olefin of 4 to 20 carbon atoms is in the range of 21 to 70% by mol; preferably contains the propylene units (E-1) in an amount of 35 to 75% by mol, the ethylene units (E-2) in an amount of 3 to 25% by mol and the units (E-3) of the α-olefin of 4 to 20 carbon atoms in an amount of 20 to 45% by mol, with the proviso that the total amount of the propylene units (E-1), the ethylene units (E-2) and the units (E-3) of the α-olefin of 4 to 20 carbon atoms is 100% by mol and the total amount of the ethylene units (E-2) and the units (E-3) of the α-olefin of 4 to 20 carbon atoms is in the range of 25 to 65% by mol; more preferably contains the propylene units (E-1) in an amount of 35 to 65% by mol, the ethylene units (E-2) in an amount of 3 to 25% by mol and the units (E-3) of the α-olefin of 4 to 20 carbon atoms in an amount of 20 to 45% by mol, with the proviso that the total amount of the propylene units (E-1), the ethylene units (E-2) and the units (E-3) of the α-olefin of 4 to 20 carbon atoms is 100% by mol and the total amount of the ethylene units (E-2) and the units (E-3) of the α-olefin of 4 to 20 carbon atoms is in the range of 35 to 65% by mol; and particularly preferably contains the propylene units (E-1) in an amount of 40 to 65% by mol, the ethylene units (E-2) in an amount of 5 to 25% by mol and the units (E-3) of the α-olefin of 4 to 20 carbon atoms in an amount of 20 to 40% by mol, with the proviso that the total amount of the propylene units (E-1), the ethylene units (E-2) and the units (E-3) of the α-olefin of 4 to 20 carbon atoms is 100% by mol and the total amount of the ethylene units (E-2) and the units (E-3) of the α-olefin of 4 to 20 carbon atoms is in the range of 35 to 60% by mol.

Moreover, the syndiotactic α-olefin-based copolymer (E-b) may contain constitutional units derived from at least one polyene selected from conjugated polyenes and non-conjugated polyenes in an amount of preferably 0 to 30% by mol, more preferably 0 to 25% by mol, based on 100% by mol of the total of the propylene units (E-1), the ethylene units (E-2) and the units (E-3) of the α-olefin of 4 to 20 carbon atoms.

When the contents of the ethylene units, the propylene units and the units of the α-olefin of 4 to 20 carbon atoms are in the above ranges, the syndiotactic α-olefin-based copolymer (E-b) exhibits sufficient transparency, flexibility, rubber elasticity and abrasion resistance. Moreover, the compatibility with the resulting thermoplastic resin becomes good, and the compatibility in the thermoplastic elastomer composition for foaming becomes good.

The α-olefin used for preparing such a syndiotactic α-olefin-based copolymer (E-b) is not specifically restricted as long as the number of carbon atoms is in the range of 4 to 20, preferably 4 to 12, and the α-olefin may be straight-chain or branched.

Examples of such α-olefins include 1-butene, 2-butene, 1-pentene, 1-hexene, 1-heptane, 1-octene, 1-nonene, 1-decene, 1-undecene, 1-dodecene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene. Preferable are 1-butene, 1-hexene, 1-octene, 1-decene and 4-methyl-1-pentene; more preferable are 1-butene, 1-hexene, 1-octene and 1-decene; and particularly preferable is 1-butene.

These α-olefins may be used singly or in combination or two or more kinds. For example, an α-olefin (i) that is one α-olefin selected from α-olefins of 4 to 20 carbon atoms and an α-olefin (ii) that is an α-olefin of 4 to 20 carbon atoms other than the α-olefin (i) can be used in a quantity ratio (i)/(ii) of 50 to 99% by mol/1 to 50% by mol ((i)+(ii)=100% by mol).

Examples of the conjugated polyenes and the non-conjugated polyenes that are arbitrary monomer components to constitute the syndiotactic α-olefin-based copolymer (E-b) are given below.

Example of the conjugated polyenes include conjugated dienes, such as 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene and 2-phenyl-1,3-butadiene; and conjugated trienes, such as 1,3,5-hexatriene. Of these, butadiene, isoprene, pentadiene, hexadiene and octadiene are preferable, and from the viewpoint of excellent copolymerizability, butadiene and isoprene are particularly preferable.

Examples of the non-conjugated polyenes include non-conjugated dienes, such as dicyclopentadiene, 1,4-hexadiene, cyclooctadiene, methylene norbornene, ethylidene norbornene, 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene and 9-methyl-1,8-undecadiene; and non-conjugated trienes, such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene, 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecadiene. Of these, 5-ethylidene-2-norbornene, 5-vinyl-2-norbornene, dicyclopentadiene (DCPD), 4,8-dimethyl-1,4,8-decatriene (DMDT) and 4-ethylidene-8-methyl-1,7-nonadiene (EMND) are preferable.

The conjugated polyenes or the non-conjugated polyenes may be used singly, or may be used in combination of two or more kinds.

It is preferable that the syndiotactic α-olefin-based copolymer (E-b) contains the conjugated polyene or the non-conjugated polyene because the copolymer (E-b) exhibits excellent abrasion resistance when it is crosslinked.

In the syndiotactic α-olefin-based copolymer (E-b), constitutional units derived from an aromatic vinyl compound such as styrene, constitutional units derived from the above polyene-based unsaturated compound having two or more double bonds, constitutional units derived from alcohol, carboxylic acid, amine and derivatives thereof, etc. may be further contained.

The intrinsic viscosity [η] of the syndiotactic α-olefin-based copolymer (E-b), as measured in decalin at 135° C., is in the range of usually 0.01 to 10 dl/g, preferably 0.05 to 10 dl/g.

The molecular weight distribution (Mw/Mn, in terms of polystyrene) of the syndiotactic α-olefin-based copolymer (E-b), as measured by gel permeation chromatography (GPC), is usually not more than 4.0, preferably 1.5 to 3.0.

It is preferable that when the syndiotactic-olefin-based copolymer (E-b) is subjected to differential scanning calorimetry (DSC), any melting peak is not present.

Preparation of Syndiotactic α-Olefin-Based Copolymer (E-b)

The syndiotactic α-olefin-based copolymer (E-b) for use in the present invention (2) can be obtained by copolymerizing propylene, ethylene and the α-olefin in the presence of a metallocene catalyst described below. Such a metallocene catalyst is, for example, a catalyst system comprising:

(x) a transition metal compound represented by the following formula (I) (also referred to as a "transition metal compound (x)" hereinafter), and (y) at least one compound selected from:

(y-1) a compound which reacts with a transition metal M in the transition metal compound (x) to form an ionic complex (referred to as an "ionizing ionic compound (y-1)" hereinafter), (y-2) an organoaluminum oxy-compound, and (y-3) an organoaluminum compound.

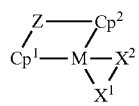
(1)

In the formula (1), M is Ti, Zr, Hf, Rn, Nd, Sm or Ru, Cp$^1$ and Cp$^2$ are each a cyclopentadienyl group, an indenyl group, a fluorenyl group or a derivative group thereof, which is π-bonded to M, X$^1$ and X$^2$ are each an anionic ligand or a neutral Lewis base ligand, and Z is an atom of C, O, B, S, Ge, Si or Sn or a group containing any of these atoms.

In the formula (1), it is preferable that Cp$^1$ and Cp$^2$ are groups different from each other, and it is more preferable that any one of Cp$^1$ and Cp$^2$ is a cyclopentadienyl group or its derivative group and the other is a fluorenyl group or its derivative group.

For preparing the syndiotactic α-olefin-based copolymer (E-b), a hitherto publicly known titanium catalyst comprising a solid titanium catalyst component and an organoaluminum compound or a hitherto publicly known vanadium catalyst comprising a soluble vanadium compound and an organoaluminum compound may be used instead of the metallocene catalyst.

In the present invention (2), ethylene, propylene and the α-olefin are copolymerized in the presence of such a metallocene catalyst as above, usually in a liquid phase. In this copolymerization, a hydrocarbon solvent is generally used as a polymerization solvent, but propylene may be used as a solvent. The copolymerization may be carried out by any of a batch process and a continuous process.

When the copolymerization is carried out by, for example, a batch process using a metallocene catalyst, the transition metal compound (x) is used in the polymerization system in an amount of usually 0.00005 to 1 mmol, preferably 0.0001 to 0.5 mmol, based on 1 liter of the polymerization volume.

The ionizing ionic compound (y-1) is used in such an amount that the molar ratio ((y-1)/(x)) of the ionizing ionic compound (y-1) to the transition metal compound (x) becomes usually 0.5 to 20, preferably 1 to 10.

The organoaluminum oxy-compound (y-2) is used in such an amount that the molar ratio (Al/M) of the aluminum atom (Al) to the transition metal atom (M) in the transition metal compound (x) becomes usually 1 to 10000, preferably 10 to 5000.

The organoaluminum compound (y-3) is used in an amount of usually about 0 to 5 mol, preferably about 0 to 2 mmol, based on 1 liter of the polymerization volume.

The copolymerization reaction is carried out under the conditions of a temperature of usually −20 to 150° C., preferably 0 to 120° C., more preferably 0 to 100° C., and a pressure of usually more than 0 but not more than 80 kg/cm$^2$, preferably more than 0 but not more than 50 kg/cm$^2$. The reaction time (in the case of continuous polymerization process: average residence time) is in the range of usually 5 minutes to 3 hours, preferably 10 minutes to 1.5 hours, though it varies depending upon the conditions such as catalyst concentration and polymerization temperature.

Propylene, ethylene and the α-olefin are each fed to the polymerization system in such an amount that a syndiotactic α-olefin-based copolymer (E-b) having the aforesaid specific composition is obtained. In the copolymerization, a molecular weight modifier, such as hydrogen, may be used. When propylene, ethylene and the α-olefin are copolymerized as above, the syndiotactic α-olefin-based copolymer (E-b) is obtained usually in the form of a polymerization solution containing a solvent and unreacted propylene, ethylene and α-olefin. This polymerization solution is treated in a conventional manner to obtain a syndiotactic α-olefin-based copolymer (E-b).

The syndiotactic α-olefin-based copolymer (E-b) is used in an amount of 1 to 20% by weight, preferably 1.2 to 18% by weight, more preferably 1.5 to 15% by weight, in 100% by weight of the total of the components (A), (B), (C), (D) and (E-b).

When the later-described isotactic propylene-based polymer (E-a) is contained, the syndiotactic α-olefin-based copolymer (E-b) is used in an amount of 1 to 20% by weight, preferably 1.2 to 18% by weight, more preferably 1.5 to 15% by weight, in 100% by weight of the total of the components (A), (B), (C), (D), (E-a) and (E-b).

Hydrogenated Conjugated Diene Polymer (F)

The thermoplastic elastomer composition for foaming of the present invention (2) may contain a hydrogenated conjugated diene polymer (F). The hydrogenated conjugated diene polymer (F) is contained in an amount of preferably 1 to 30 parts by weight, more preferably 2 to 28 parts by weight, particularly preferably 3 to 25 parts by weight, based on 100 parts by weight of the total of the components (A), (B), (C), (D) and (E-b), or based on 100 parts by weight of the total of the components (A), (B), (C), (D), (E-a) and (E-b).

The hydrogenated conjugated diene polymer (F) for use in the present invention (2) is a polymer wherein at least 80% of double bonds of conjugated diene units in the hydrogenated conjugated diene polymer has been hydrogenated. Examples of the hydrogenated conjugated diene polymers (F) include hydrogenation products of block copolymers of vinyl aromatic compounds and conjugated dienes, such as a styrene/butadiene block copolymer and a styrene/isoprene block copolymer; hydrogenation products of homopolymers of conjugated dienes, such as polybutadiene and polyisoprene;

and hydrogenation products of random copolymers of vinyl aromatic compounds and conjugated dienes. In particular, the following hydrogenated conjugated diene-based polymers (4-1), (4-2) and (4-3) are preferable.

(4-1) Hydrogenated Conjugated Diene-Based Polymer

When a polymer block containing a vinyl aromatic compound as a main component is taken as A (block A), a homopolymer block of a conjugated diene or a random copolymer block of a vinyl aromatic compound and a conjugated diene is taken as B (block B), and a tapered block which is composed of a copolymer block of a vinyl aromatic compound and a conjugated diene and in which the content of the vinyl aromatic compound gradually increases toward the molecular chain end is taken as C (block C), the hydrogenated conjugated diene-based polymer (4-1) comprises a hydrogenation product of a block copolymer containing a block arrangement of A-B, A-B-A or A-B-C (such a block copolymer being referred to as a "block copolymer (4-1)" hereinafter). Examples of the vinyl aromatic compounds used in the block copolymer (4-1) include styrene, α-methylstyrene, o-methylstyrene, m-methylstyrene, p-methylstyrene, p-t-butylstyrene, divinylbenzene, diisopropenylstyrene, o-chlorostyrene, m-chlorostyrene, p-chlorostyrene, 1,1-diphenylethylene, N,N'-dimethyl-p-aminostyrene, N,N'-diethyl-p-aminostyrene and vinylpyridine. In particular, styrene and α-methylstyrene are preferable. Examples of the conjugated dienes used in the block copolymer (4-1) include butadiene, isoprene, 2,3-dimethylbutadiene, 1,3-pentadiene, 2-methyl-1,3-pentadiene, 1,3-hexadiene, 4,5-diethyl-1,3-octadiene, 3-butyl-1,3-octadiene, chloroprene and 2,3-dichlorobutadiene. In order to obtain a hydrogenated conjugated diene-based polymer which is readily utilized industrially and is excellent also in properties, butadiene, isoprene and 1,3-pentadiene are preferable, and butadiene is particularly preferable. In the block copolymer (4-1), the content of the vinyl aromatic compound in the block A is preferably not less than 90% by weight, more preferably 95 to 100% by weight, of all the monomers in this block. In this case, the type of a copolymerizable monomer other than the vinyl aromatic compound is not specifically restricted. The total content of the vinyl aromatic compounds in the block A and the block C is in the range of preferably 3 to 50% by weight, more preferably 5 to 40% by weight, particularly preferably 5 to 30% by weight. The vinyl bond content in the conjugated diene units in the block B is preferably not less than 20%, more preferably not less than 40%, particularly preferably not less than 60%. If the vinyl bond content is less than 20% by mol, the effect of improving flexibility of the hydrogenated conjugated diene-based polymer tends to be lowered. In the block copolymer (4-1), the weight ratio of the vinyl aromatic compound to the conjugated diene is usually (5 to 60)/(95 to 40), preferably (7 to 50)/(93 to 50). If the content of the vinyl aromatic compound is less than 5% by weight and the content of the conjugated diene exceeds 95% by weight, strength, processability, heat resistance, etc. of the elastomer composition tend to be lowered, and blocking tends to occur when the hydrogenated conjugated diene-based polymer is pelletized. On the other hand, if the content of the vinyl aromatic compound exceeds 60% by weight and the content of the conjugated diene is less than 40% by weight, the hydrogenated conjugated diene-based polymer becomes resinous, and the impact resistance, low-temperature properties, etc. tend to be lowered. In the block copolymer (4-1), the content of the vinyl aromatic compound in the block A is preferably not less than 3% by weight, more preferably 5 to 30% by mol, of all the monomers. If the content of the vinyl aromatic compound is less than 3% by weight, mechanical strength, processability, heat resistance, etc. of the hydrogenated conjugated diene-based polymer tend to be lowered. As for the content of each block in the block copolymer (4-1), the content of the block A is in the range of usually 3 to 50% by weight, preferably 4 to 40% by weight, the content of the block B is in the range of usually 30 to 97% by weight, preferably 35 to 94% by weight, and the content of the block C is in the range of usually 0 to 50% by weight, in 100% by weight of the total of the blocks A to C. In the case of the block copolymer having a block arrangement of A-B-C, the content of the block C is preferably 2 to 40% by weight in 100% by weight of the total of the blocks A to C. As for Mn of each block in the block copolymer (4-1), Mn of the block A is in the range of usually 1,000 to 350,000, preferably 4,000 to 240,000, Mn of the block B is in the range of usually 15,000 to 680,000, preferably 35,000 to 570,000, and Mn of the block C is in the range of usually 0 to 350,000, preferably 2,000 to 240,000. The block copolymer (4-1) can be prepared by anionic living polymerization of monomers for constituting the respective blocks, or may be prepared by coupling a living block copolymer prepared by the anionic living polymerization, using an appropriate coupling agent. The block copolymer obtained by the above coupling has any one of structures represented by, for example, the following formulas (I) to (III) in which a copolymer chain of each block has been extended or branched.

(I) [A-B] n-X, (II) [A-B-A] n-X, (III) [A-B-C] n-X

In the above formulas, A, B and C are the same as the aforesaid blocks A to C, n is an integer of 2 to 4, and X is a coupling agent residue. Examples of the coupling agents include diethyl adipate, divinylbenzene, tetrachlorosilicon, butyltrichlorosilicon, tetrachlorotin, butyltrichlorotin, dimethyldichlorosilicon, tetrachlorogermanium, 1,2-dibromoethane, 1,4-di(chloromethyl)benzene, bis(trichlorosilyl)ethane, epoxidized linseed oil, tolylene diisocyanate and 1,2,4-benzene triisocyanate. Mn of the block copolymer (4-1) is in the range of usually 50,000 to 700,000, preferably 100,000 to 600,000. If the Mn is less than 50,000, mechanical strength, fluidity, processability, heat resistance, etc. of the hydrogenated conjugated diene-based polymer tend to be lowered. On the other hand, if the Mn exceeds 700,000, fluidity, processability, flexibility, etc. of the hydrogenated conjugated diene-based polymer tend to be lowered. The hydrogenation ratio of the hydrogenated conjugated diene-based polymer (4-1) is usually not less than 80%, preferably not less than 90%, more preferably 95 to 100%. If the hydrogenation ratio is less than 80%, heat stability and durability of the elastomer composition are lowered. The process for preparing the hydrogenated conjugated diene-based polymer (4-1) is described in, for example, Japanese Patent Laid-Open Publication No. 72512/1991.

(4-2) Hydrogenated Conjugated Diene-Based Polymer

When a polymer block containing a vinyl aromatic compound as a main component is taken as D (block D), a homopolymer block of a conjugated diene is taken as E (block E), and a polybutadiene block is taken as F (block F), the hydrogenated conjugated diene-based polymer (4-2) comprises a hydrogenation product of a block copolymer containing a block arrangement of D-E-F (such a block copolymer being referred to as a "block copolymer (4-2)" hereinafter). Examples of the vinyl aromatic compounds and the conjugated dienes used in the block copolymer (4-2) include the same compounds as given in the aforesaid block copolymer (4-1). In the block copolymer (4-2), the content of the vinyl aromatic compound in the block D is preferably not less than 90% by weight, more preferably 95 to 100% by weight, of all the monomers in this block. If the content of the vinyl aromatic compound is less than 90% by weight, mechanical strength, weathering resistance, etc. of the hydrogenated conjugated diene-based polymer tend to be lowered. The vinyl bond content in the conjugated diene units in the block E is in the range of preferably 25 to 95%, more preferably 30 to 90%. In the case where the conjugated diene is, for example, butadiene, if the vinyl bond content is less than 25% by mol, a polyethylene chain is formed by hydrogenation, and on the other hand, if the vinyl bond content exceeds 95%, the glass transition temperature after hydrogenation of the block D is increased, and in either case, rubber-like properties of the hydrogenated conjugated diene-based polymer tend to be lowered. The vinyl bond content in the butadiene units in the block F is preferably less than 25%, more preferably less than 20%. If the vinyl bond content is not less than 25% by mol, resin-like properties after hydrogenation of the block F are impaired, and the properties of the hydrogenated conjugated diene-based polymer having a block structure as an elastomer tend to be lowered. As for the content of each of the blocks D to F in the block copolymer (4-2), the content of the block D is in the range of usually 5 to 60% by weight, preferably 10 to 55% by weight, the content of the block E is in the range of usually 30 to 90% by weight, preferably 35 to 80% by weight, and the content of the block F is in the range of usually 5 to 60% by weight, preferably 5 to 50% by weight, in 100% by weight of the total of the blocks D to F. If the content of the block D is less than 5% by weight, heat resistance, mechanical strength, etc. of the hydrogenated conjugated diene-based polymer tend to be lowered. On the other hand, if the content of the block D exceeds 60% by weight, processability, mechanical strength, etc. of the hydrogenated conjugated diene-based polymer tend to be lowered. If the content of the block E is less than 30% by weight, flexibility of the hydrogenated conjugated diene-based polymer tends to be lowered. On the other hand, the content of the block E exceeds 90% by weight, processibility, mechanical strength, etc. of the hydrogenated conjugated diene-based polymer tend to be lowered. If the content of the block F is less than 5% by weight, mechanical properties of the hydrogenated conjugated diene-based polymer tend to be lowered. On the other hand, if the content of the block F exceeds 60% by weight, rubber-like properties of the hydrogenated conjugated diene-based polymer tend to be lowered. As for Mn of each block in the block copolymer (4-2), Mn of the block D is in the range of usually 2,000 to 420,000, Mn of the block E is in the range of usually 15,000 to 630,000, preferably 35,000 to 420,000, and Mn of the block F is in the range of usually 2,000 to 420,000. The block copolymer (4-2) can be prepared by anionic living polymerization of monomers for constituting the respective blocks, or may be prepared by coupling a living block copolymer prepared by the anionic living polymerization, using an appropriate coupling agent. The block copolymer obtained by the above coupling has a structure represented by, for example, the following formula (IV) or (V) in which a copolymer chain of each block has been extended or branched.

(IV) [D-E-F] n-X, (V) [D-E-F]-X-[D-E]

In the above formulas, D, E and F are the same as the aforesaid blocks D to F, n is an integer of 2 to 4, and X is a coupling agent residue. Examples of the coupling agents include the same compounds as given in the aforesaid block copolymer (4-1). Mn of the block copolymer (4-2) is in the range of usually 50,000 to 700,000, preferably 100,000 to 600,000. If the Mn is less than 50,000, mechanical strength, fluidity, processability, heat resistance, etc. of the hydrogenated conjugated diene-based polymer tend to be lowered. On the other hand, if the Mn exceeds 700,000, fluidity, processability, flexibility, etc. of the hydrogenated conjugated diene-based polymer tend to be lowered. The hydrogenation ratio of the hydrogenated conjugated diene-based polymer (4-2) is usually not less than 80%, preferably not less than 90%, more preferably 95 to 100%. If the hydrogenation ratio is less than 80%, heat stability and durability of the elastomer composition are lowered. The process for preparing the hydrogenated conjugated diene-based polymer (4-2) is described in, for example, Japanese Patent Laid-Open Publication No. 133406/1990.

(4-3) Hydrogenated Conjugated Diene-Based Polymer

When a polybutadiene polymer block having a vinyl bond content of not more than 25% is taken as G (block G) and a homopolymer block of a conjugated diene or a random copolymer block of a vinyl aromatic compound and a conjugated diene wherein the vinyl bond content in the conjugated diene units is 25 to 95% is taken as H (block H), the hydrogenated conjugated diene-based polymer (4-3) comprises a hydrogenation product of a block copolymer containing a block arrangement of G-H or G-H-G (such a block copolymer being referred to as a "block copolymer (4-3)" hereinafter). Examples of the vinyl aromatic compounds and the conjugated dienes used in the block copolymer (4-3) include the same compounds as given in the aforesaid block copolymer (4-1). By virtue of hydrogenation, the block G in the block copolymer (4-3) forms a crystalline polymer chain having a structure analogous to that of a usual low-density polyethylene chain. Although the vinyl bond content in the butadiene units in the block G is usually not more than 25%, it is preferably not more than 20%, more preferably not more than 15%. If the vinyl bond content exceeds 25% by mol, depression of a crystal melting point due to hydrogenation of the block G becomes large, and the mechanical strength of the hydrogenated conjugated diene-based polymer tends to be lowered. By virtue of hydrogenation, the block H in the block copolymer (4-3) forms a polymer chain having a structure analogous to that of a rubber-like ethylene/1-butene copolymer chain or a vinyl aromatic compound/ethylene/1-butene copolymer chain. The content of the vinyl aromatic compound in the block H is usually not more than 35% by weight, preferably not more than 30% by weight, more preferably not more than 25% by weight, of all the monomers in this block. If the content of the vinyl aromatic compound exceeds 35% by weight, elevation of the glass transition point after hydrogenation of the block H becomes large, and the low-temperature properties, flexibility, etc. of the hydrogenated conjugated diene-based polymer tend to be lowered. Although the vinyl bond content in the conjugated diene units in the block H is in the range of 25 to 95%, it is in the range of preferably 25 to 75%, more preferably 25 to 55%. In the case where the conjugated diene is, for example, butadiene, if the vinyl bond content is less than 25% or exceeds 95%, a crystalline polymer chain having a structure analogous to that of a polyethylene chain or a poly-1-butene chain is formed by hydrogenation, and the hydrogenated conjugated diene-based polymer becomes resinous, whereby flexibility of the hydrogenated conjugated diene-based polymer tends to be lowered. As for the content of each of the blocks G and H in the block copolymer (4-3), the content of the block G is in the range of usually 5 to 90% by weight, preferably 10 to 80% by weight, and the content of the block H is in the range of usually 95 to 10% by weight, preferably 90 to 20% by weight, in 100% by weight of the total of the blocks G and H. If the content of the block G is less than 5% by weight and the content of the block H exceeds 95% by weight, crystalline polymer blocks in the hydrogenated conjugated diene-based polymer are insufficient, and the mechanical properties tend to be lowered. On the other hand, if the content of the block G exceeds 90% by weight and the content of the block H is less than 10% by weight, hardness of the hydrogenated conjugated diene-based polymer tends to be increased. As for Mn of each block in the block copolymer (4-3), Mn of the block G is in the range of usually 2,000 to 630,000, preferably 10,000 to 480,000, and Mn of the block H is in the range of usually 5,000 to 670,000, preferably 20,000 to 540,000. The block copolymer (4-3) can be prepared by anionic living polymerization of monomers for constituting the respective blocks, or may be prepared by coupling a living block copolymer prepared by the anionic living polymerization, using an appropriate coupling agent. The block copolymer obtained by the above coupling has a structure represented by, for example, the following formula (VI) or (VII) in which a copolymer chain of each block has been extended or branched.

(VI) [G-H] n-X, (VII) [G-H-G] n-X

In the above formulas, G and H are the same as the aforesaid blocks G and H, n is an integer of 2 to 4, and X is a coupling agent residue. Examples of the coupling agents include the same compounds as given in the aforesaid block copolymer (4-1). Mn of the block copolymer (4-3) is in the range of usually 50,000 to 700,000, preferably 100,000 to 600,000. If the Mn is less than 50,000, mechanical strength, heat resistance, fluidity, processability, etc. of the hydrogenated conjugated diene-based polymer tend to be lowered. On the other hand, if the Mn exceeds 700,000, fluidity, processability, flexibility, etc. of the hydrogenated conjugated diene-based polymer tend to be lowered. The hydrogenation ratio of the hydrogenated conjugated diene-based polymer (4-3) is usually not less than 80%, preferably not less than 90%, more preferably 95 to 100%. If the hydrogenation ratio is less than 80%, heat stability and durability of the elastomer composition are lowered. The process for preparing the hydrogenated conjugated diene-based polymer (4-3) is described in, for example, Japanese Patent Laid-Open Publication No. 1289576/1991.

The hydrogenated conjugated diene-based polymers (4-1) to (4-3) may have an appropriate functional group. Examples of such functional groups include carboxyl group, acid anhydride group, hydroxyl group, epoxy group, halogen atom, amino group, isocyanate group, sulfonyl group and sulfonate group. Examples of methods to introduce the functional group into the hydrogenated conjugated diene-based polymer include (1) a method wherein a conjugated diene or a vinyl aromatic compound having the functional group is used as a monomer in the preparation of an unhydrogenated conjugated diene-based polymer, (co)polymerization is carried out with protecting the functional group to obtain a conjugated diene-based polymer, and then the protective group is eliminated to convert the group into a given functional group, (2) a method wherein onto an unhydrogenated conjugated diene-based polymer or a hydrogenated conjugated diene-based polymer, an unsaturated monomer having the functional group is graft polymerized, followed by carrying out hydrogenation when needed, and (3) a method wherein a hydrogenated conjugated diene-based polymer and at least one unsaturated monomer having the functional group are kneaded by a kneader, a mixer, an extruder or the like in the presence or absence of a radical catalyst such as an organic peroxide or an azo compound to perform addition of the functional group. In any of these methods, the functional group can be introduced efficiently, but the method (3) is industrially simple and advantageous. Examples of the functional group-containing unsaturated monomers for use in the method (3) include (meth)acrylic acid, crotonic acid, itaconic acid, maleic acid, cinnamic acid, maleic anhydride, itaconic anhydride, hydroxyethyl(meth)acrylate, hydroxypropyl(meth)acrylate, glycidyl(meth)acrylate, allyl glycidyl ether, chloroethyl (meth)acrylate, chloropropyl (meth)acrylate, dimethylaminoethyl(meth)acrylate and dimethylaminopropyl(meth)acrylate. The content of the functional group in the hydrogenated conjugated diene-based polymers (4-1) to (4-3) containing the functional group is in the range of usually 0.01 to 10% by mol, preferably 0.1 to 8% by mol, more preferably 0.15 to 5% by mol, based on the hydrogenated conjugated diene-based polymer. The hydrogenated conjugated diene-based polymers may be used singly or in combination of two or more kinds.

Isotactic Propylene-Based Polymer (E-a)

The thermoplastic elastomer composition for foaming of the present invention (2) may contain an isotactic propylene-based polymer (E-a).

The isotactic propylene-based polymer (E-a) for use in the present invention (2) satisfies the following requirements (i) to (iv).

(i) The molecular weight distribution (Mw/Mn), as measured by gel permeation chromatography (GPC), is in the range of 1 to 10.

(ii) The amount of constitutional units derived from propylene is in the range of 40 to 85% by mol and the amount of constitutional units derived from an α-olefin of 2 to 20 carbon atoms (other than propylene) is in the range of 60 to 15% by mol, with the proviso that the total amount of the propylene units and the units of the α-olefin of 2 to 20 carbon atoms is 100% by mol.

(iii) The melt flow rate (MFR, ASTM D1238, 190° C., load of 2.16 kg) is in the range of 0.1 to 50 g/10 min.

(iv) A melting point, as determined by differential scanning calorimetry (DSC), is not observed. Observation of a melting point is carried out when the sample is held at 200° C. for 5 minutes, then cooled down to −20° C. at a cooling rate of −20° C./min and heated again up to 180° C. at a heating rate of 20° C./min, and the expression "melting point is not observed" means that a crystal melting peak the amount of heat of crystal fusion of which is not less than 1 J/g is not observed.

The isotactic propylene-based polymer (E-a) more preferably satisfies the following requirements (i') to (iv').

(i') The molecular weight distribution (Mw/Mn), as measured by gel permeation chromatography (GPC), is in the range of 1 to 3.

(ii') The amount of constitutional units derived from propylene is in the range of 40 to 85% by mol, the amount of constitutional units derived from ethylene is in the range of 5 to 30% by mol, and the amount of constitutional units derived from an α-olefin of 4 to 20 carbon atoms is in the range of 5 to 30% by mol, with the proviso that the total amount of the propylene units, the ethylene units and the units of the α-olefin of 4 to 20 carbon atoms is 100% by mol.

Of the above requirements, a preferred embodiment of the requirement (ii') is that the amount of constitutional units derived from propylene is in the range of 60 to 82% by mol, preferably 61 to 75% by mol, the amount of constitutional units derived from ethylene is in the range of 8 to 15% by mol, preferably 10 to 14% by mol, and the amount of constitutional units derived from an α-olefin of 4 to 20 carbon atoms is in the range of 10 to 25% by mol, preferably 15 to 25% by mol, with the proviso that the total amount of the propylene units, the ethylene units and the units of the α-olefin of 4 to 20 carbon atoms is 100% by mol.

(iii') The melt flow rate (MFR, ASTM D1238, 190° C., load of 2.16 kg) is in the range of 0.1 to 50 g/10 min.

(iv') A melting point, as determined by differential scanning calorimetry (DSC), is not observed.

The isotactic propylene-based polymer (E-a) preferably further satisfies at least one of the following requirements (v') and (vi'), preferably both of them, in addition to the above requirements (i') to (iv').

(v') The Shore A hardness is in the range of usually 0 to 80, preferably 35 to 60.

(vi') The crystallinity, as measured by X-ray diffractometry, is usually not more than 20%, preferably not more than 10%.

The isotactic propylene-based polymer (E-a) for use in the present invention (2) is a homopolymer of propylene, and/or a random copolymer of propylene and an α-olefin of 2 to 20 carbon atoms (other than propylene). Examples of the α-olefins of 2 to 20 carbon atoms include ethylene, 1-butene, 1-hexene, 4-methyl-1-pentene and 1-octene. Of these, ethylene and α-olefins of 4 to 20 carbon atoms are preferable, and ethylene and 1-butene are particularly preferable.

The isotactic propylene-based polymer (E-a) is obtained by polymerizing propylene or propylene and other α-olefins using a publicly known stereoregular catalyst, and in particular, a copolymer obtained by the use of a metallocene catalyst is preferable because the resulting molded product has little surface tackiness. In this case, the molecular weight distribution (Mw/Mn), as determined by gel permeation chromatography (GPC), is in the range of 1 to 3.

The isotactic propylene-based polymer (E-a) can be obtained by a process described in, for example, International Publication No. 2004/87775 Pamphlet.

The isotactic propylene-based polymer (E-a) is contained in an amount of 1 to 30% by weight, preferably 1.2 to 28% by weight, more preferably 1.5 to 25% by weight, based on 100% by weight of the total of the components (A), (B), (C), (D), (E-a) and (E-b).

Other Components

To the thermoplastic elastomer composition for foaming of the present invention (2), additives, such as hitherto publicly known inorganic filler, heat stabilizer, anti-aging gent, weathering stabilizer, antistatic agent, crystal nucleating agent and lubricant, may be added within limits not detrimental to the object of the present invention (2).

Examples of the inorganic fillers include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bulb, Shirasu balloon, basic magnesium sulfate whisker, calcium titanate whisker and aluminum borate whisker.

Examples of the lubricants include higher fatty acid amides, metallic soaps, waxes, silicone oils and fluorine-based polymers. Of these, higher fatty acid amides, silicone oils and fluorine-based polymers are preferable. The lubricant has an effect of improving moldability of the thermoplastic elastomer composition for foaming.

Examples of the higher fatty acid amides include saturated fatty acid amides, such as lauric acid amide, palmitic acid amide, stearic acid amide and behemic acid amide; unsaturated fatty acid amides, such as erucic acid amide, oleic acid amide, brassidic acid amide and elaidic acid amide; and bis-fatty acid amides, such as methylenebisstearic acid amide, methylenebisoleic acid amide, ethylenebisstearic acid amide and ethylenebisoleic acid amide.

Examples of the silicone oils include dimethyl silicone oil, phenylmethyl silicone oil, alkyl silicone oil, fluorosilicone oil, tetramethyltetraphenyltrisiloxane and modified silicone oil.

Examples of the fluorine-based polymers include polytetrafluoroethylene and a vinylidene fluoride copolymerization product.

Thermoplastic Elastomer Composition for Foaming

The thermoplastic elastomer composition for foaming of the present invention (2) can be prepared by melt kneading the partially or completely crosslinked ethylene/α-olefin/non-conjugated polyene copolymer rubber (A), the ethylene/α-olefin copolymer (B), the polypropylene (C), the softener (D) for rubbers, the syndiotactic α-olefin-based copolymer (E-b), and if necessary, the hydrogenated conjugated diene copolymer (F) and/or the isotactic propylene-based polymer (E-a), etc.

As the kneading apparatus, a mixing roll, an intensive mixer (e.g., Banbury mixer, kneader), a single screw or twin-screw extruder or the like can be used, and a non-open type apparatus is preferable.

Thermoplastic Elastomer Molded Foam

The thermoplastic elastomer molded foam (also referred to as a "molded foam" simply hereinafter) of the present invention (2) is obtained by molding the above thermoplastic elastomer composition for foaming.

It is preferable that a blowing agent (H) is added to the thermoplastic elastomer composition for foaming, when needed, followed by foaming the composition. Examples of the blowing agents (H) include an inorganic or organic thermal decomposition type blowing agent (chemical blowing agent), carbon dioxide, nitrogen, and a mixture of carbon dioxide and nitrogen.

Examples of the inorganic thermal decomposition type blowing agents include carbonates, such as sodium hydrogencarbonate, sodium carbonate, ammonium hydrogencarbonate and ammonium carbonate, and nitrites, such as ammonium nitrite.

Examples of the organic thermal decomposition type blowing agents include nitroso compounds, such as N,N'-dimethyl-N,N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonyl hydrazide compounds, such as benzenesulfonyl hydrazide, toluenesulfonyl hydrazide, p,p'-oxybis(benzenesulfonyl hydrazide) and diphenylsulfone-3,3'-disulfonyl hydrazide; and azide compounds, such as calcium azide, 4,4'-diphenyl disulfonyl azide and p-toluenesulfonyl azide.

When carbon dioxide or nitrogen is used, the thermoplastic elastomer composition for foaming is melted at 100 to 300° C. in a resin plasticating cylinder to form a molten foamable thermoplastic elastomer composition in which the thermoplastic elastomer composition for foaming and carbon dioxide or nitrogen are compatible with each other.

The blowing agent (H) is used in an amount of usually 0.5 to 30 parts by weight, preferably 1 to 20 parts by weight, based on 100 parts by weight of the thermoplastic elastomer composition for foaming.

Moreover, a blowing aid may be added, when needed. The amount of the blowing aid added is in the range of usually 0.01 to 10 parts by weight, preferably 0.02 to 5 parts by weight, based on 100 parts by weight of the thermoplastic elastomer composition for foaming.

Examples of the blowing aids include compounds of metals such as zinc, calcium, lead, iron and barium, higher fatty acids and metal salts thereof, such as stearic acid, and inorganic fine particles, such as talc, barium sulfate and silica. More specifically, there can be mentioned mixtures of polyvalent carboxylic acids, such as citric acid, oxalic acid, fumaric acid, phthalic acid, malic acid, tartaric acid, lactic acid, cyclohexane-1,2-dicarboxylic acid, camphoric acid, ethylenediaminetetraacetic acid, triethylenetetraminehexaacetic acid and nitrilo acid, and inorganic carbonic acid compounds, such as sodium hydrogencarbonate, sodium aluminum hydrogencarbonate and potassium hydrogencarbonate, intermediate products formed by the reaction of them, e.g., salts of polycarboxylic acids, such as sodium dihydrogencitrate and potassium oxalate.

The blowing aid has functions of lowering of decomposition temperature of the blowing agent, acceleration of decomposition, formation of foam nucleus, making cells uniform, etc., so that use of the blowing aid is generally desirable. In particular, a compound that is decomposed at the extrusion temperature in the formation of raw material pellets or a temperature in the vicinity of the melting temperature of the foam has an effect of uniformly forming foam cells of small diameters.

It is particularly preferable that the thermoplastic elastomer composition for foaming of the present invention (2) is foamed using an inorganic or organic thermal decomposition type blowing agent, and as a blowing aid, a mixture of a polyvalent carboxylic acid and a hydrogencarbonate, specifically a mixture of citric acid and sodium hydrogencarbonate, or disodium citrate that is a reaction intermediate product thereof.

The blowing agent or the blowing aid may be dry blended prior to injection molding so as to be decomposed in the injection molding, or may be added after it is melt blended with pellets.

The process for preparing a molded foam from the thermoplastic elastomer composition for foaming of the present invention (2) is not specifically restricted, and the molded foam can be prepared by extrusion method, press molding, injection molding, blow molding, extrusion blow molding, injection blow molding, inflation method, stamping, compression molding, bead molding or the like using a molding machine that is used for publicly known resin processing.

As an example of the process, a process for preparing a molded foam by extrusion method using, as a blowing agent, carbon dioxide that is in a supercritical state is given below. That is to say, the thermoplastic elastomer composition for foaming of the present invention (2) is melted in an extruder, then carbon dioxide is heated to not lower than the critical temperature (31° C.) of carbon dioxide at a pressure of critical pressure range (7.4 to 40 MPa) to give supercritical carbon dioxide, and the supercritical carbon dioxide is mixed with the molten thermoplastic elastomer composition in the extruder. Subsequently, the molten thermoplastic elastomer composition mixed with the supercritical carbon dioxide is transferred to a die connected to the tip of the extruder preset at an optimum blowing temperature, and extruded from the die into the atmosphere to abruptly lower the pressure, whereby carbon dioxide is gasified to foam the composition. The composition thus foamed is cooled with the succeeding cooling device and solidified to obtain a desired molded foam. The temperature of the thermoplastic elastomer composition during the extrusion is desirably set in the range of 110 to 250° C.

As another example, a process for preparing a molded foam by press molding is given below. That is to say, the aforesaid chemical blowing agent and pellets of the thermoplastic elastomer composition for foaming are placed in a heated mold of a press molding machine, and the thermoplastic elastomer composition is melted with or without applying a mold pressure and then foamed to produce a molded foam. In this case, the temperature of the mold is desirably set in the range of 110 to 250° C.

As a further example, a process for preparing the thermoplastic elastomer molded foam of the present invention (2) by injection molding is given below. That is to say, the thermoplastic elastomer composition for foaming is heated and melted by an injection molding machine and then injected into a mold so as to foam the composition at the nozzle tip, whereby a molded foam is produced. The resin temperature during the injection is preferably in the range of 110 to 250° C.

Since the thermoplastic elastomer composition for foaming of the present invention (2) has high fluidity, it is desirable to produce a molded foam by injection molding. Moreover, the following injection foam molding by core back process is preferable. That is to say, the thermoplastic elastomer composition for foaming is injected into a cavity of an injection mold that is in a closed state. After the injection is completed, a moving core is moved with maintaining contact with the mold wall surface by virtue of expansion of the resin due to the blowing gas and stopped at the position of a predetermined reference wall thickness to perform molding. After cooling of the mold is completed, the moving core is moved backward to take out the product, whereby a molded foam is obtained.

The molded foam of the present invention (2) may be laminated onto a polyolefin-based resin substrate in accordance with, for example, the following embodiments 1 to 3.

Embodiment 1

Molding method: calendering or T-die extrusion foam molding

Laminating method: successive method comprising producing a sheet of a polyolefin-based resin substrate layer by foam molding and then laminating a surface layer onto the substrate layer is carried out, or in the case of T-die extrusion method, simultaneous multi-layer extrusion foam molding is carried out.

Embodiment 2

Molding method: multi-layer extrusion foam molding

Laminating method: simultaneous multi-layer extrusion foam molding for a polyolefin-based resin substrate layer and a surface layer is carried out.

Embodiment 3

Molding method: successive or simultaneous injection foam molding

Laminating method: successive injection foam molding method comprising producing a polyolefin-based resin substrate layer by injection foaming and then injecting a thermoplastic elastomer composition for foaming that gives a surface layer, to laminate them in the mold is carried out, or simultaneous method comprising simultaneously injecting a substrate layer and a surface layer by so-called sandwich molding and foaming the laminate is carried out.

Although the above laminating methods can be considered, it is preferable that a composite molded product obtained by laminating a molded foam of the thermoplastic elastomer composition for foaming of the present invention (2) onto a polyolefin-based resin substrate is used for an instrument panel for automobile.

In this case, it is preferable to carry out the following molding methods.

Two-Color Molding Method

In the two-color molding method, a polyolefin-based resin substrate is produced, and subsequently injection foam molding is carried out, whereby a composite molded product in which the polyolefin-based resin substrate is bonded to the thermoplastic elastomer molded foam of the present invention (2) is obtained.

Insert Molding Method

In the insert molding method, a polyolefin-based resin substrate is produced in advance and placed in an injection mold, and then injection foam molding is carried out, whereby a composite molded product in which the polyolefin-based resin substrate is bonded to the injection molded foam is obtained. By using a polypropylene-based resin for the polyolefin-based resin substrate, better bond properties are obtained.

EXAMPLES

Example I

The present invention (1) is further described with reference to the following examples, but it should be construed that the present invention (1) is in no way limited to those examples.

Melt flow rate, hardness and needle penetration temperature (° C.) of foamable thermoplastic elastomer compositions obtained in the examples and the comparative examples were measured in accordance with the following methods.

[1] Melt Flow Rate (MFR)

In accordance with ASTM D1238, a melt flow rate was measured at 230° C. under a load of 2.16 kg.

[2] Shore A Hardness

In accordance with JIS K6253, a sheet was prepared by a press molding machine, and immediately after contact of an indenter point, the scale of an A type measuring device was read out.

[3] Needle Penetration Temperature (° C.)

In accordance with JIS K7196, a specimen having a thickness of 1 mm was used, and on the specimen, a pressure of 2 kg/cm$^2$ was applied to a plane indenter having a diameter of 1.8 mm at a heating rate of 5° C./min. From a TMA curve, a needle penetration temperature (° C.) at a penetration depth of 0.5 mm was determined.

[4] Condition of Foam Layer

A foam layer of the resulting molded foam was cut, and the condition of bubbles formed was observed by a stereo microscope (10 magnifications).

The condition of the foam layer was evaluated in the following manner.

AA: Bubbles are uniform, and break, tear, etc. of bubbles are not observed.

BB: Bubbles are partially non-uniform, but break, tear, etc. of bubbles are not observed.

CC: Bubbles are non-uniform, and break, tear, etc. of bubbles are partially observed.

DD: Break, tear, etc. of bubbles are marked, or blisters occur, and hence, evaluation is impossible.

[5] Appearance

Appearance of the resulting molded foam was visually observed and evaluated by the following criteria.

AA: The molded foam is free from a depressed area, such as sink mark, pockmark or weldline, and has a smooth surface.

BB: The above defect is observed and becomes a problem in practical use.

[6] Feel

The surface of the resulting molded foam is pressed with a finger and evaluated by the following criteria.

AA: The surface of the molded foam has a soft feel close to that of a laminate of a vinyl chloride skin and a urethane foam.

BB: The surface of the molded foam is hard like a resin molded article and has no soft feel.

Polymerization Example 1-1

Synthesis of Isotactic Propylene/Butene/Ethylene Copolymer

In a 2000 ml polymerization device thoroughly purged with nitrogen, 917 ml of dry hexane, 85 g of 1-butene and triisobutylaluminum (1.0 mmol) were placed at ordinary temperature, then the internal temperature of the polymerization device was raised to 65° C., and the system was pressurized to 0.77 MPa with propylene, followed by adjusting the pressure in the system to 0.78 MPa with ethylene. Subsequently, in the polymerization device, a toluene solution obtained by contacting 0.002 mmol of dimethylmethylene(3-t-butyl-5-methylcyclopentadienyl)fluorenyl zirconium dichloride with 0.6 mmol (in terms of aluminum) of methylaluminoxane (available from Tosoh Finechem Corporation) was introduced. With maintaining the internal temperature at 65° C. and the pressure in the system at 0.78 MPa with ethylene, polymerization was carried out for 20 minutes, and thereafter, 20 ml of methanol was added to terminate the polymerization. After the pressure was released, a polymer was precipitated from the polymerization solution in 2 liters of methanol, and the precipitated polymer was dried at 130° C. for 12 hours under vacuum to obtain 60.4 g of a polymer.

The resulting polymer had an intrinsic viscosity [η] of 1.81 dl/g, a glass transition temperature Tg of −27° C., an ethylene unit content of 13% by mol, a butene unit content of 19% by mol and a molecular weight distribution (Mw/Mn), as measured by GPC, of 2.4. In the DSC measurement, a clear melting peak was not confirmed.

Example 1-1

In a Henschel mixer, 80 parts by weight of an oil-extended ethylene/propylene/5-ethylidene-2-norbornene copolymer rubber (EPT-1) (ethylene unit content: 78% by mol, iodine value: 13, intrinsic viscosity [η]: 3.4 dl/g, quantity of oil extension: 40 parts by weight of a softener (D-1) for rubbers (Diana Process Oil PW-380, available from Idemitsu Kosan Co., Ltd.) based on 100 parts by weight of rubber), 20 parts by weight of polypropylene of block type (ethylene unit content: 14% by mol, PP-1) having a melt flow rate (ASTM D1238 65T, 230° C., load of 2.16 kg) of 10 g/10 min, 0.3 part by weight of an organic peroxide (Perhexa 25B, available from NOF Corporation) as a crosslinking agent, 0.3 part by weight of divinylbenzene as a crosslinking assistant and 0.1 part by weight of a phenol-based antioxidant (Irganox 1010, available from Nihon Ciba-Geigy K.K.) as an antioxidant were sufficiently mixed, and the mixture was kneaded by an extruder (product number: KTX-46, manufactured by Kobe Steel, Ltd., cylinder temperature: C1-C2 120° C., C3-C4 140° C., C5-C14 200° C., die temperature: 200° C., screw rotation speed: 400 rpm, extrusion rate: 80 kg/hr) with pouring 25 parts by weight of a softener (D-1) for rubbers (Diana Process Oil PW-380, available from Idemitsu Kosan Co., Ltd.) into a cylinder, to obtain pellets of a partially or completely crosslinked thermoplastic elastomer composition (x-0).

Of the components to constitute the resulting partially or completely crosslinked thermoplastic elastomer composition (x-0), the ethylene/propylene/5-ethylidene-2-norbornene copolymer rubber used as a raw material is regarded as a partially or completely crosslinked ethylene/α-olefin/non-conjugated polyene copolymer rubber (A-1) comprising ethylene, an α-olefin of 3 to 20 carbon atoms and a non-conjugated polyene.

Subsequently, in a Henschel mixer, 55% by weight of the partially or completely crosslinked thermoplastic elastomer composition (x-0), 21% by weight of an ethylene/butene-1 copolymer rubber (EBR-1) having a melt flow rate (ASTM D1238, 230° C., load of 2.16 kg) of 7 g/10 min and an ethylene unit content of 89% by mol, 11% by weight of polypropylene of block type (ethylene unit content: 9% by mol, PP-2) having a melt flow rate (ASTM D1238 65T, 230° C., load of 2.16 kg) of 35 g/10 min, 8% by weight of a propylene homopolymer (c-1) having a melt tension, at 190° C., of 12 g and a melt flow rate (ASTM D1238 65T, 230° C., load of 2.16 kg) of 2 g/10 min, 5% by weight of the isotactic propylene/butene/ethylene copolymer obtained in Polymerization Example 1-1, 2.5 parts by weight of a carbon masterbatch of 40% concentration as a carbon masterbatch, 0.2 part by weight of a phenol-based antioxidant (Irganox 1010, available from Nihon Ciba-Geigy K.K.) as an antioxidant and 0.3 part by weight of a diazo-based weathering stabilizer (Tinuvin 326, available from Nihon Ciba-Geigy K.K.) as a weathering agent were sufficiently mixed, and the mixture was kneaded by an extruder (product number: KTX-46, manufactured by Kobe Steel, Ltd., cylinder temperature: C1-C2 120° C., C3-C4 140° C., C5-C14 200° C., die temperature: 200° C., screw rotation speed: 400 rpm, extrusion rate: 80 kg/hr) with pouring 18 parts by weight of a softener (D-1) for rubbers (Diana Process Oil PW-380, available from Idemitsu Kosan Co., Ltd.) into a cylinder, to obtain pellets of a thermoplastic elastomer composition for foaming.

Compounding ratios of the raw materials are set forth in Table 1-1.

As shown in Table 1-2, the components to constitute the thermoplastic elastomer composition for foaming were:

a partially or completely crosslinked ethylene/α-olefin/non-conjugated polyene copolymer rubber (A) comprising ethylene, an α-olefin of 3 to 20 carbon atoms and a non-conjugated polyene: 21% by weight, an ethylene/α-olefin copolymer (B): 18% by weight, polypropylene (C): 24% by weight (content of polypropylene (c) having a melt tension, at 190° C., of not less than 3 g in 100 parts by weight of polypropylene (C): 29 parts by weight), a softener (D) for rubbers: 33% by weight, and an isotactic propylene-based polymer (E): 4% by weight.

Next, to 100 parts by weight of the resulting thermoplastic elastomer composition for foaming were added 2 parts by weight of Hydrocerol CF (available from Boehringer Ingelheim Chemicals, Inc.) as a foam nucleating agent, and using an injection molding machine having a core-back mechanism (150-ton injection molding machine manufactured by Meiki Co., Ltd.), molding was carried out. That is to say, the molten resin was injected into a mold (cavity of mold: 2 mm) under the conditions of an injection temperature of 220° C. and a mold temperature of 50° C. After charging was completed, a moving core was moved by 2 mm to increase the internal volume of the cavity, and after cooling was completed, the molded product was taken out.

The thermoplastic elastomer composition for foaming and the molded foam were evaluated in accordance with the aforesaid methods.

The results are set forth in Table 1-2.

Example 1-2

With pouring 18 parts by weight of a softener (D-1) for rubbers (Diana Process Oil PW-380, available from Idemitsu Kosan Co., Ltd.) into a cylinder, kneading was carried out by an extruder in the same manner as in Example 1-1, except that 16% by weight of an ethylene/propylene copolymer rubber (EPR-1) having a melt flow rate (ASTM D1238, 230° C., load of 2.16 kg) of 7 g/10 min and an ethylene unit content of 78% by mol was used instead of the ethylene/butene-1 copolymer rubber (EBR-1), and 10% by weight of the isotactic propylene/butene/ethylene copolymer obtained in Polymerization Example 1-1 was used. Thus, pellets of a thermoplastic elastomer composition for foaming were obtained.

Compounding ratios of the raw materials used in Example 1-2 and the components to constitute the thermoplastic elastomer composition for foaming are set forth in Tables 1-1 and 1-2.

Using the resulting thermoplastic elastomer composition for foaming, a molded product was prepared in the same manner as in Example 1-1.

The results are set forth in Table 1-2.

Example 1-3

With pouring 10 parts by weight of a softener (D-1) for rubbers (Diana Process Oil PW-380, available from Idemitsu Kosan Co., Ltd.) into a cylinder, kneading was carried out by an extruder in the same manner as in Example 1-1, except that 65% by weight of the partially or completely crosslinked thermoplastic elastomer composition (x-0) was used, 12.5% by weight of an ethylene/butene-1 copolymer rubber (EBR-2) having a melt flow rate (ASTM D1238, 230° C., load of 2.16 kg) of 65 g/10 min and an ethylene unit content of 78% by mol was used instead of the ethylene/butene-1 copolymer rubber (EBR-1), 7.5% by weight of the polypropylene (PP-2) was used, and 10% by weight of the propylene homopolymer (c-1) was used. Thus, pellets of a thermoplastic elastomer composition for foaming were obtained.

Compounding ratios of the raw materials used in Example 1-3 and the components to constitute the thermoplastic elastomer composition for foaming are set forth in Tables 1-1 and 1-2.

Using the resulting thermoplastic elastomer composition for foaming, a molded product was prepared in the same manner as in Example 1-1.

The results are set forth in Table 1-2.

Comparative Example 1-1

With pouring 10 parts by weight of a softener (D-1) for rubbers (Diana Process Oil PW-380, available from Idemitsu Kosan Co., Ltd.) into a cylinder, kneading was carried out by an extruder in the same manner as in Example 1-1, except that 60% by weight of the partially or completely crosslinked thermoplastic elastomer composition (x-0) was used, 22% by weight of the ethylene/butene-1 copolymer rubber (EBR-1) was used, 8% by weight of the polypropylene (PP-2) was used, 10% by weight of the propylene homopolymer (c-1) was used, and the isotactic propylene/butene/ethylene copolymer obtained in Polymerization Example 1-1 was not used. Thus, pellets of a thermoplastic elastomer composition for foaming were obtained.

Compounding ratios of the raw materials used in Comparative Example 1-1 and the components to constitute the thermoplastic elastomer composition for foaming are set forth in Tables 1-1 and 1-2.

Using the resulting thermoplastic elastomer composition for foaming, a molded product was prepared in the same manner as in Example 1-1.

The results are set forth in Table 1-2.

Comparative Example 1-2

Without pouring a softener (D-1) for rubbers into a cylinder, kneading was carried out by an extruder in the same manner as in Example 1-1, except that 50% by weight of the partially or completely crosslinked thermoplastic elastomer composition (x-0) was used, 8% by weight of an ethylene/propylene copolymer rubber (EPR-1) having a melt flow rate (ASTM D1238, 230° C., load of 2.16 kg) of 7 g/10 min and an ethylene content of 78% by mol was used instead of the ethylene/butene-1 copolymer rubber (EBR-1), 30% by weight of the polypropylene (PP-2) was used, and 7% by weight of the propylene homopolymer (c-1) was used. Thus, pellets of a thermoplastic elastomer composition for foaming were obtained.

Compounding ratios of the raw materials used in Comparative Example 1-2 and the components to constitute the thermoplastic elastomer composition for foaming are set forth in Tables 1-1 and 1-2.

Using the resulting thermoplastic elastomer composition for foaming, a molded product was prepared in the same manner as in Example 1-1.

The results are set forth in Table 1-2.

Comparative Example 1-3

With pouring 7.5 parts by weight of a softener (D-1) for rubbers (Diana Process Oil PW-380, available from Idemitsu Kosan Co., Ltd.) into a cylinder, kneading was carried out by an extruder in the same manner as in Example 1-1, except that 36% by weight of the partially or completely crosslinked thermoplastic elastomer composition (x-0) was used, 38% by weight of the ethylene/butene-1 copolymer rubber (EBR-1) was used, 14% by weight of the polypropylene (PP-2) was used, and 7% by weight of the propylene homopolymer (c-1) was used. Thus, pellets of a thermoplastic elastomer composition for foaming were obtained.

Compounding ratios of the raw materials used in Comparative Example 1-3 and the components to constitute the thermoplastic elastomer composition for foaming are set forth in Tables 1-1 and 1-2.

Using the resulting thermoplastic elastomer composition for foaming, a molded product was prepared in the same manner as in Example 1-1.

The results are set forth in Table 1-2.

Comparative Example 1-4

Pellets of a thermoplastic elastomer composition (x-1) were obtained in the same manner as in Example 1-1, except that the crosslinking agent and the crosslinking assistant were not used.

Pellets of a thermoplastic elastomer composition for foaming were obtained in the same manner as in the preparation of the thermoplastic elastomer composition for foaming of Example 1-1, except that the thermoplastic elastomer composition (x-1) was used instead of the thermoplastic elastomer composition (x-0).

Compounding ratios of the raw materials used in Comparative Example 1-4 and the components to constitute the thermoplastic elastomer composition for foaming are set forth in Tables 1-1 and 1-2.

Using the resulting thermoplastic elastomer composition for foaming, a molded product was prepared in the same manner as in Example 1-1.

The results are set forth in Table 1-2.

Comparative Example 1-5

With pouring 18 parts by weight of a softener (D-1) for rubbers (Diana Process Oil PW-380, available from Idemitsu Kosan Co., Ltd.) into a cylinder, kneading was carried out by an extruder in the same manner as in Example 1-1, except that the ethylene/butene-1 copolymer rubber (EBR-1) was not used, and 26% by weight of the isotactic propylene/butene/ethylene copolymer obtained in Polymerization Example 1-1 was used. Thus, pellets of a thermoplastic elastomer composition for foaming were obtained.

Compounding ratios of the raw materials used in Comparative Example 1-5 and the components to constitute the thermoplastic elastomer composition for foaming are set forth in Tables 1-1 and 1-2.

Using the resulting thermoplastic elastomer composition for foaming, a molded product was prepared in the same manner as in Example 1-1.

The results are set forth in Table 1-2.

TABLE 1-1

|  |  | Ex. 1-1 | Ex. 1-2 | Ex. 1-3 | Comp. Ex. 1-1 | Comp. Ex. 1-2 | Comp. Ex. 1-3 | Comp. Ex. 1-4 | Comp. Ex. 1-5 |
|---|---|---|---|---|---|---|---|---|---|
| Thermoplastic elastomer composition (x-0) | wt % | 55 | 55 | 65 | 60 | 50 | 36 |  | 55 |
| Thermoplastic elastomer composition (x-1) | wt % |  |  |  |  |  |  | 55 |  |
| Ethylene/butene-1 copolymer rubber (EBR-1) | wt % | 21 |  |  | 22 |  | 38 | 21 |  |
| Ethylene/butene-1 copolymer rubber (EBR-2) | wt % |  |  | 12.5 |  |  |  |  |  |
| Ethylene/propylene copolymer rubber (EPR-1) | wt % |  | 16 |  |  | 8 |  |  |  |
| Polypropylene (PP-2) | wt % | 11 | 11 | 7.5 | 8 | 30 | 14 | 11 | 11 |
| Propylene homopolymer (c-1) | wt % | 8 | 8 | 10 | 10 | 7 | 7 | 8 | 8 |
| Isotactic propylene/butene/ethylene copolymer (Polymerization Example 1-1) | wt % | 5 | 10 | 5 |  | 5 | 5 | 5 | 26 |
| Total | wt % | 100 | 100 | 100 | 100 | 100 | 100 | 100 | 100 |
| Softener (D-1) for rubbers | phr | 18 | 18 | 10 | 10 |  | 7.5 | 18 | 18 |
| Carbon masterbatch | phr | 2.5 | 2.5 | 2.5 | 2.5 | 2.5 | 2.5 | 2.5 | 2.5 |
| Antioxidant | phr | 0.2 | 0.2 | 0.2 | 0.2 | 0.2 | 0.2 | 0.2 | 0.2 |
| Weathering stabilizer | phr | 0.3 | 0.3 | 0.3 | 0.3 | 0.3 | 0.3 | 0.3 | 0.3 |

TABLE 1-2

|  |  | Ex. 1-1 | Ex. 1-2 | Ex. 1-3 | Comp. Ex. 1-1 | Comp. Ex. 1-2 | Comp. Ex. 1-3 | Comp. Ex. 1-4 | Comp. Ex. 1-5 |
|---|---|---|---|---|---|---|---|---|---|
| Component (A) | wt % | 21 | 21 | 27 | 25 | 23 | 15 |  | 21 |
| Component (B) | wt % | 18 | 14 | 11 | 20 | 8 | 35 | 39 |  |
| Component (C) | wt % | 24 | 24 | 25 | 25 | 45 | 25 | 24 | 24 |
| Polypropylene (c) |  | 7 | 7 | 9 | 9 | 7 | 6.5 | 7 | 7 |
| Component (D) | wt % | 33 | 33 | 32 | 30 | 19 | 20 | 33 | 33 |
| Component (E-a) | wt % | 4 | 8 | 5 | 0 | 5 | 5 | 4 | 22 |
| Total | wt % | 100 | 100 | 100 | 100 | 100 | 100 | 100 | 100 |
| Content of polypropylene (c) having melt tension, at 190° C., of not less than 3 g in 100 parts by weight of the component (C) | part(s) by weight | 29% | 29% | 36% | 36% | 16% | 26% | 29% | 29% |
| MFR (230° C., load of 2.16 kg) |  | 20 | 25 | 20 | 15 | 15 | 20 | 30 | 15 |
| Hardness (Shore A) |  | 78 | 76 | 76 | 78 | 91 | 70 | 75 | 85 |
| Needle penetration temperature (° C.) |  | 135 | 130 | 135 | 130 | 140 | 80 | 90 | 140 |
| Condition of foam layer |  | AA | AA | AA | DD | BB | CC | BB | CC |
| Appearance |  | AA | AA | AA | AA | AA | AA | AA | AA |
| Feel |  | AA | AA | AA | AA | BB | AA | AA | BB |

Example II

The present invention (2) is further described with reference to the following examples, but it should be construed that the present invention (2) is in no way limited to those examples.

Melt flow rate, hardness and needle penetration temperature (° C.) of foamable thermoplastic elastomer compositions obtained in the examples and the comparative examples were measured in accordance with the following methods.

[1] Melt Flow Rate (MFR)

In accordance with ASTM D1238, a melt flow rate was measured at 230° C. under a load of 2.16 kg.

[2] Shore A Hardness

In accordance with JIS K6253, a sheet was prepared by a press molding machine, and immediately after contact of an indenter point, the scale of an A type measuring device was read out.

[3] Needle Penetration Temperature (° C.)

In accordance with JIS K7196, a specimen having a thickness of 1 mm was used, and on the specimen, a pressure of 2 kg/cm$^2$ was applied to a plane indenter having a diameter of 1.8 mm at a heating rate of 5° C./min. From a TMA curve, a needle penetration temperature (° C.) at a penetration depth of 0.5 mm was determined.

[4] Condition of Foam Layer

A foam layer of the resulting molded foam was cut, and the condition of bubbles formed was observed by a stereo microscope (10 magnifications).

The condition of the foam layer was evaluated in the following manner.

AA: Bubbles are uniform, and break, tear, etc. of bubbles are not observed.

BB: Bubbles are partially non-uniform, but break, tear, etc. of bubbles are not observed.

CC: Bubbles are non-uniform, and break, tear, etc. of bubbles are partially observed.

DD: Break, tear, etc. of bubbles are marked, or blisters occur, and hence, evaluation is impossible.

[5] Appearance

Appearance of the resulting molded foam was visually observed and evaluated by the following criteria.

AA: The molded foam is free from a depressed area, such as sink mark, pockmark or weldline, and has a smooth surface.

BB: The above defect is observed and becomes a problem in practical use.

[6] Feel

The surface of the resulting molded foam is pressed with a finger and evaluated by the following criteria.

AA: The surface of the molded foam has a soft feel close to that of a laminate of a vinyl chloride skin and a urethane foam.

BB: The surface of the molded foam is hard like a resin molded article and has no soft feel.

Polymerization Example 2-1

Synthesis of Syndiotactic Propylene/Butene/Ethylene Copolymer

In a 2000 ml polymerization device thoroughly purged with nitrogen, 100 ml of dry hexane, 480 g of 1-butene and triisobutylaluminum (1.0 mmol) were placed at ordinary temperature, then the internal temperature of the polymerization device was raised to 35° C., and the device was pressurized to 0.54 MPa with propylene and then pressurized to 0.62 MPa with ethylene. Thereafter, in the polymerization device, a toluene solution obtained by contacting 0.005 mmol of diphenylmethylene (cyclopentadienyl) fluorenyl zirconium dichloride with 1.5 mmol (in terms of aluminum) of methylaluminoxane (available from Tosoh Finechem Corporation) was introduced. With maintaining the internal temperature at 35° C. and the ethylene pressure at 0.62 MPa, polymerization was carried out for 5 minutes, and 20 ml of methanol was added to terminate the polymerization. After the pressure was released, a polymer was precipitated from the polymerization solution in 2 liters of methanol, and the precipitated polymer was dried at 130° C. for 12 hours under vacuum to obtain 36.1 g of a polymer.

The resulting polymer had a propylene unit content of 61.3% by mol, an ethylene unit content of 10.3% by mol, a 1-butene unit content of 28.4% by mol, an intrinsic viscosity [η] of 2.67 dl/g and a glass transition temperature Tg of −27.7° C. In the DSC measurement, a melting peak was not observed, and the molecular weight distribution (Mw/Mn), as measured by GPC, was 2.0. According to the $^{13}$C-NMR spectrum as measured in a 1,2,4-trichlorobenzene solution using tetramethylsilane as a reference material, the sum total of absorptions of methyl groups of propylene units (propylene methyl groups) observed at about 20.0 to 21.0 ppm was 0.8 time the absorption intensities assigned to propylene methyl groups observed at about 19.0 to 22.0 ppm.

Polymerization Example 2-2

Synthesis of Isotactic Propylene/Butene/Ethylene Copolymer

In a 2000 ml polymerization device thoroughly purged with nitrogen, 917 ml of dry hexane, 85 g of 1-butene and triisobutylaluminum (1.0 mmol) were placed at ordinary temperature, then the internal temperature of the polymerization device was raised to 65° C., and the system was pressurized to 0.77 MPa with propylene, followed by adjusting the pressure in the system to 0.78 MPa with ethylene. Subsequently, in the polymerization device, a toluene solution obtained by contacting 0.002 mmol of dimethylmethylene(3-t-butyl-5-methylcyclopentadienyl)fluorenyl zirconium dichloride with 0.6 mmol (in terms of aluminum) of methylaluminoxane (available from Tosoh Finechem Corporation) was introduced. With maintaining the internal temperature at 65° C. and the pressure in the system at 0.78 MPa with ethylene, polymerization was carried out for 20 minutes, and 20 ml of methanol was added to terminate the polymerization. After the pressure was released, a polymer was precipitated from the polymerization solution in 2 liters of methanol, and the precipitated polymer was dried at 130° C. for 12 hours under vacuum to obtain 60.4 g of a polymer.

The resulting polymer had an intrinsic viscosity [ ] of 1.81 dl/g, a glass transition temperature Tg of −27° C., an ethylene unit content of 13% by mol, a butene unit content of 19% by mol and a molecular weight distribution (Mw/Mn), as measured by GPC, of 2.4. In the DSC measurement, a clear melting peak was not confirmed.

Example 2-1

In a Henschel mixer, 80 parts by weight of an oil-extended ethylene/propylene/5-ethylidene-2-norbornene copolymer rubber (EPT-1) (ethylene unit content: 78% by mol, iodine value: 13, intrinsic viscosity [η]: 3.4 dl/g, quantity of oil extension: 40 parts by weight of softener (D-1) for rubbers (Diana Process Oil PW-380, available from Idemitsu Kosan Co., Ltd.) based on 100 parts by weight of rubber), 20 parts by weight of polypropylene of block type (ethylene unit content: 14% by mol, PP-1) having a melt flow rate (ASTM D1238 65T, 230° C., load of 2.16 kg) of 10 g/10 min, 0.3 part by weight of an organic peroxide (Perhexa 25B, available from NOF Corporation) as a crosslinking agent, 0.3 part by weight of divinylbenzene as a crosslinking assistant and 0.1 part by weight of a phenol-based antioxidant (Irganox 1010, available from Nihon Ciba-Geigy K.K.) as an antioxidant were sufficiently mixed, and the mixture was kneaded by an extruder (product number: KTX-46, manufactured by Kobe Steel, Ltd., cylinder temperature: C1-C2 120° C., C3-C4 140° C., C5-C14 200° C., die temperature: 200° C., screw rotation speed: 400 rpm, extrusion rate: 80 kg/hr) with pouring 25 parts by weight of a softener (D-1) for rubbers (Diana Process Oil PW-380, available from Idemitsu Kosan Co., Ltd.) into a cylinder, to obtain pellets of a partially or completely crosslinked thermoplastic elastomer composition (x-0).

Of the components to constitute the resulting partially or completely crosslinked thermoplastic elastomer composition (x-0), the ethylene/propylene/5-ethylidene-2-norbornene copolymer rubber used as a raw material is regarded as a partially or completely crosslinked ethylene/α-olefin/non-conjugated polyene copolymer rubber (A-1) comprising ethylene, an α-olefin of 3 to 20 carbon atoms and a non-conjugated polyene.

Subsequently, in a Henschel mixer, 60% by weight of the partially or completely crosslinked thermoplastic elastomer composition (x-0), 12.5% by weight of an ethylene/butene-1 copolymer rubber (EBR-1) having a melt flow rate (ASTM D1238, 230° C., load of 2.16 kg) of 7 g/10 min and an ethylene content of 89% by mol, 7.5% by weight of polypropylene of block type (ethylene unit content: 9% by mol, PP-2) having a melt flow rate (ASTM D1238 65T, 230° C., load of 2.16 kg) of 35 g/10 min, 10% by weight of a propylene homopolymer (c-1) having a melt tension, at 190° C., of 12 g and a melt flow rate (ASTM D1238 65T, 230° C., load of 2.16 kg) of 2 g/10 min, 10% by weight of the syndiotactic propylene/butene/ethylene copolymer obtained in Polymerization Example 2-1, 2.5 parts by weight of a carbon masterbatch of 40% concentration as a carbon masterbatch, 0.2 part by weight of a phenol-based antioxidant (Irganox 1010, available from Nihon Ciba-Geigy K.K.) as an antioxidant and 0.3 part by weight of a diazo-based weathering stabilizer (Tinuvin 326, available from Nihon Ciba-Geigy K.K.) as a weathering agent were sufficiently mixed, and the mixture was kneaded by an extruder (product number: KTX-46, manufactured by Kobe Steel, Ltd., cylinder temperature: C1-C2 120° C., C3-C4 140° C., C5-C14 200° C., die temperature: 200° C., screw rotation speed: 400 rpm, extrusion rate: 80 kg/hr) with pouring 10 parts by weight of a softener (D-1) for rubbers (Diana Process Oil PW-380, available from Idemitsu Kosan Co., Ltd.) into a cylinder, to obtain pellets of a thermoplastic elastomer composition for foaming.

Compounding ratios of the raw materials are set forth in Table 2-1.

As shown in Table 2-2, the components to constitute the thermoplastic elastomer composition for foaming were:

a partially or completely crosslinked ethylene/α-olefin/non-conjugated polyene copolymer rubber (A) comprising ethylene, an α-olefin of 3 to 20 carbon atoms and a non-conjugated polyene: 25% by weight, an ethylene/α-olefin copolymer (B): 11% by weight, polypropylene (C): 25% by weight (content of polypropylene (c) having a melt tension, at 190° C., of not less than 3 g in 100 parts by weight of polypropylene (C): 36 parts by weight), a softener (D) for rubbers: 30% by weight, and a syndiotactic α-olefin-based copolymer (E): 9% by weight.

Next, to 100 parts by weight of the resulting thermoplastic elastomer composition for foaming were added 2 parts by weight of Hydrocerol CF (available from Boehringer Ingelheim Chemicals, Inc.) as a foam nucleating agent, and using an injection molding machine having a core-back mechanism (150-ton injection molding machine manufactured by Meiki Co., Ltd.), molding was carried out. That is to say, the molten resin was injected into a mold (cavity of mold: 2 mm) under the conditions of an injection temperature of 220° C. and a mold temperature of 50° C. After charging was completed, a moving core was moved by 2 mm to increase the internal volume of the cavity, and after cooling was completed, the molded product was taken out.

The thermoplastic elastomer composition for foaming and the molded foam were evaluated in accordance with the aforesaid methods. The results are set forth in Table 2-2.

Example 2-2

With pouring 7.5 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that 70% by weight of the partially or completely crosslinked thermoplastic elastomer composition (x-0) was used, 8% by weight of an ethylene/propylene copolymer rubber (EPR-1) having a melt flow rate (ASTM D1238, 230° C., load of 2.16 kg) of 7 g/10 min and an ethylene unit content of 78% by mol was used instead of the ethylene/butene-1 copolymer rubber (EBR-1), 8% by weight of the polypropylene (PP-2) was used, 7.5% by weight of the propylene homopolymer (c-1) was used, 6.5% by weight of the syndiotactic propylene/butene/ethylene copolymer obtained in Polymerization Example 2-1 was used, and 7 parts by weight of a hydrogenation product (F-1) of a styrene/butadiene/styrene block copolymer (styrene unit content: 30% by weight, number-average molecular weight (Mn): 100,000) and 7 parts by weight of the isotactic propylene/butene/ethylene copolymer obtained in Polymerization Example 2-2 were further added. Thus, pellets of a thermoplastic elastomer composition for foaming were obtained.

Compounding ratios of the raw materials used in Example 2-2 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Example 2-3

With pouring 15 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that 70% by weight of the partially or completely crosslinked thermoplastic elastomer composition (x-0) was used, 10% by weight of the ethylene/butene-1 copolymer rubber (EBR-1) was used, 5% by weight of the polypropylene (PP-2) was used, 5% by weight of the syndiotactic propylene/butene/ethylene copolymer obtained in Polymerization Example 2-1 was used, and 7 parts by weight of the isotactic propylene/butene/ethylene copolymer obtained in Polymerization Example 2-2 were further added. Thus, pellets of a thermoplastic elastomer composition for foaming were obtained.

Compounding ratios of the raw materials used in Example 2-3 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Example 2-4

With pouring 16 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that 40% by weight of the partially or completely crosslinked thermoplastic elastomer composition (x-0) was used, 30% by weight of an ethylene/propylene copolymer rubber (EPR-1) having a melt flow rate (ASTM D1238, 230° C., load of 2.16 kg) of 7 g/10 min and an ethylene unit content of 78% by mol was used instead of the ethylene/butene-1 copolymer rubber (EBR-1), 20% by weight of the polypropylene (PP-2) was used, 5% by weight of the propylene homopolymer (c-1) was used, 5% by weight of the syndiotactic propylene/butene/ethylene copolymer obtained in Polymerization Example 2-1 was used, and 18 parts by weight of a hydrogenation product (F-1) of a styrene/butadiene/styrene block copolymer (styrene unit content: 30% by weight, number-average molecular weight (Mn): 100,000) were further added. Thus, pellets of a thermoplastic elastomer composition for foaming were obtained.

Compounding ratios of the raw materials used in Example 2-4 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Comparative Example 2-1

With pouring 10 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that 60% by weight of the partially or completely crosslinked thermoplastic elastomer composition (x-0) was used, 22% by weight of the ethylene/butene-1 copolymer rubber (EBR-1) was used, 8% by weight of the polypropylene (PP-2) was used, and the syndiotactic propylene/butene/ethylene copolymer obtained in Polymerization Example 2-1 was not used. Thus, pellets of a thermoplastic elastomer composition for foaming were obtained.

Compounding ratios of the raw materials used in Comparative Example 2-1 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Comparative Example 2-2

With pouring 7.5 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that 70% by weight of the partially or completely crosslinked thermoplastic elastomer composition (x-0) was used, 16% by weight of an ethylene/propylene copolymer rubber (EPR-1) having a melt flow rate (ASTM D1238, 230° C., load of 2.16 kg) of 7 g/10 min and an ethylene content of 78% by mol was used instead of the ethylene/butene-1 copolymer rubber (EBR-1), 7% by weight of the polypropylene (PP-2) was used, 7% by weight of the propylene homopolymer (c-1) was used, 7 parts by weight of a hydrogenation product (F-1) of a styrene/butadiene/styrene block copolymer (styrene unit content: 30% by weight, number-average molecular weight (Mn): 100,000) were further added, and the syndiotactic propylene/butene/ethylene copolymer obtained in Polymerization Example 2-1 was not used. Thus, pellets of a thermoplastic elastomer composition for foaming were obtained.

Compounding ratios of the raw materials used in Comparative Example 2-2 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Comparative Example 2-3

With pouring 45 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that 17% by weight of the partially or completely crosslinked thermoplastic elastomer composition (x-0) was used, 41% by weight of the ethylene/butene-1 copolymer rubber (EBR-1) was used, 26% by weight of the polypropylene (PP-2) was used, 9% by weight of the propylene homopolymer (c-1) was used, and 7% by weight of the syndiotactic propylene/butene/ethylene copolymer obtained in Polymerization Example 2-1 was used. Thus, pellets of a thermoplastic elastomer composition for foaming were obtained.

Compounding ratios of the raw materials used in Comparative Example 2-3 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Comparative Example 2-4

Without pouring a softener (D-1) for rubbers into a cylinder, kneading was carried out by an extruder in the same manner as in Example 2-1, except that 50% by weight of the partially or completely crosslinked thermoplastic elastomer composition (x-0) was used, 8% by weight of an ethylene/propylene copolymer rubber (EPR-1) having a melt flow rate (ASTM D1238, 230° C., load of 2.16 kg) of 7 g/10 min and an ethylene content of 78% by mol was used instead of the ethylene/butene-1 copolymer rubber (EBR-1), 30% by weight of the polypropylene (PP-2) was used, 7% by weight of the propylene homopolymer (c-1) was used, and 5% by weight of the syndiotactic propylene/butene/ethylene copolymer obtained in Polymerization Example 2-1 was used. Thus, pellets of a thermoplastic elastomer composition for foaming were obtained.

Compounding ratios of the raw materials used in Comparative Example 2-4 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Comparative Example 2-5

With pouring 7.5 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that 36% by weight of the partially or completely crosslinked thermoplastic elastomer composition (x-0) was used, 38% by weight of the ethylene/butene-1 copolymer rubber (EBR-1) was used, 14% by weight of the polypropylene (PP-2) was used, 7% by weight of the propylene homopolymer (c-1) was used, and 5% by weight of the syndiotactic propylene/butene/ethylene copolymer obtained in Polymerization Example 2-1 was used. Thus, pellets of a thermoplastic elastomer composition for foaming were obtained.

Compounding ratios of the raw materials used in Comparative Example 2-5 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Comparative Example 2-6

With pouring 16 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that 40% by weight of the partially or completely crosslinked thermoplastic elastomer composition (x-0) was used, 8% by weight of an ethylene/propylene copolymer rubber (EPR-1) having a melt flow rate (ASTM D1238, 230° C., load of 2.16 kg) of 7 g/10 min and an ethylene content of 78% by mol was used instead of the ethylene/butene-1 copolymer rubber (EBR-1), 16% by weight of the polypropylene (PP-2) was used, 8% by weight of the propylene homopolymer (c-1) was used, and 28% by weight of the syndiotactic propylene/butene/ethylene copolymer obtained in Polymerization Example 2-1 was used. Thus, pellets of a thermoplastic elastomer composition for foaming were obtained.

Compounding ratios of the raw materials used in Comparative Example 2-6 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Comparative Example 2-7

Pellets of a thermoplastic elastomer composition (x-1) were obtained in the same manner as in Example 2-1, except that the crosslinking agent and the crosslinking assistant were not used.

Pellets of a thermoplastic elastomer composition for foaming were obtained in the same manner as in the preparation of the thermoplastic elastomer composition for foaming of Example 2-1, except that the thermoplastic elastomer composition (x-1) was used instead of the thermoplastic elastomer composition (x-0).

Compounding ratios of the raw materials used in Comparative Example 2-7 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

Comparative Example 2-8

With pouring 10 parts by weight of a softener (D-1) for rubbers (Diana Process Oil PW-380, available from Idemitsu Kosan Co., Ltd.) into a cylinder, kneading was carried out by an extruder in the same manner as in Example 2-1, except that the ethylene/butene-1 copolymer rubber (EBR-1) was not used, 12% by weight of the polypropylene (PP-2) was used, and 18% by weight of the syndiotactic propylene/butene/ethylene copolymer obtained in Polymerization Example 2-1 was used. Thus, pellets of a thermoplastic elastomer composition for foaming were obtained.

Compounding ratios of the raw materials used in Comparative Example 2-8 and the components to constitute the thermoplastic elastomer composition for foaming are set forth in Tables 2-1 and 2-2.

Using the resulting thermoplastic elastomer composition for foaming, a molded product was prepared in the same manner as in Example 2-1.

The results are set forth in Table 2-2.

TABLE 2-1

|  |  | Ex. 2-1 | Ex. 2-2 | Ex. 2-3 | Ex. 2-4 | Comp. Ex. 2-1 | Comp. Ex. 2-2 | Comp. Ex. 2-3 | Comp. Ex. 2-4 | Comp. Ex. 2-5 | Comp. Ex. 2-6 | Comp. Ex. 2-7 | Comp. Ex. 2-8 |
|---|---|---|---|---|---|---|---|---|---|---|---|---|---|
| Thermoplastic elastomer composition (x-0) | wt % | 60 | 70 | 70 | 40 | 60 | 70 | 17 | 50 | 36 | 40 |  | 60 |
| Thermoplastic elastomer composition (x-1) | wt % |  |  |  |  |  |  |  |  |  |  | 60 |  |
| Ethylene/butene-1 copolymer rubber (EBR-1) | wt % | 12.5 |  | 10 |  | 22 |  | 41 |  | 38 |  | 12.5 |  |
| Ethylene/propylene copolymer rubber (EPR-1) |  |  | 8 |  | 30 |  | 16 |  | 8 |  | 8 |  |  |
| Polypropylene (PP-2) | wt % | 7.5 | 8 | 5 | 20 | 8 | 7 | 26 | 30 | 14 | 16 | 7.5 | 12 |
| Propylene homopolymer (c-1) | wt % | 10 | 7.5 | 10 | 5 | 10 | 7 | 9 | 7 | 7 | 8 | 10 | 10 |
| Syndiotactic propylene/butene/ethylene copolymer (Polymerization Example 2-1) | wt % | 10 | 6.5 | 5 | 5 |  |  | 7 | 5 | 5 | 28 | 10 | 18 |
| Total | wt % | 100 | 100 | 100 | 100 | 100 | 100 | 100 | 100 | 100 | 100 | 100 | 100 |
| Hydrogenation product (F-1) of styrene/butadiene/styrene block | phr |  | 7 |  | 18 |  | 7 | 0 |  |  |  |  |  |
| Isotactic propylene/butene/ethylene copolymer (Polymerization Example 2-2) | phr |  | 7 | 7 |  |  |  | 0 |  |  |  |  |  |
| Softener (D-1) for rubbers | phr | 10 | 7.5 | 15 | 16 | 10 | 7.5 | 45 |  | 7.5 | 16 | 10 | 10 |
| Carbon masterbatch | phr | 2.5 | 2.5 | 2.5 | 2.5 | 2.5 | 2.5 | 2.5 | 2.5 | 2.5 | 2.5 | 2.5 | 2.5 |
| Antioxidant | phr | 0.2 | 0.2 | 0.2 | 0.2 | 0.2 | 0.2 | 0.2 | 0.2 | 0.2 | 0.2 | 0.2 | 0.2 |
| Weathering stabilizer | phr | 0.3 | 0.3 | 0.3 | 0.3 | 0.3 | 0.3 | 0.3 | 0.3 | 0.3 | 0.3 | 0.3 | 0.3 |

TABLE 2-2

|  |  | Ex. 2-1 | Ex. 2-2 | Ex. 2-3 | Ex. 2-4 | Comp. Ex. 2-1 | Comp. Ex. 2-2 | Comp. Ex. 2-3 | Comp. Ex. 2-4 | Comp. Ex. 2-5 | Comp. Ex. 2-6 | Comp. Ex. 2-7 | Comp. Ex. 2-8 |
|---|---|---|---|---|---|---|---|---|---|---|---|---|---|
| Component (A) | wt % | 25 | 30 | 28 | 16 | 25 | 30 | 5 | 23 | 15 | 16 |  | 25 |
| Component (B) | wt % | 11 | 7 | 9 | 26 | 20 | 15 | 28 | 8 | 35 | 7 | 36 |  |
| Component ( ) | wt % | 25 | 25 | 23 | 27 | 25 | 23 | 26 | 45 | 25 | 26 | 25 | 29 |
| Polypropylene ( ) |  | 9 | 7 | 9 | 4 | 9 | 6.5 | 6 | 7 | 6.5 | 7 | 9 | 9 |
| Component (D) | wt % | 30 | 32 | 36 | 27 | 30 | 32 | 36 | 19 | 20 | 27 | 30 | 30 |
| Component (E-b) | wt % | 9 | 6 | 4 | 4 | 0 | 0 | 5 | 5 | 5 | 24 | 9 | 16 |
| Component (F) | phr |  | 6.5 | 0 | 16 |  | 6.5 |  |  |  |  |  |  |
| Component (E-a) | phr |  | 6.5 | 6 | 0 |  |  |  |  |  |  |  |  |
| Total | wt % | 100 | 113 | 106 | 116 | 100 | 106.5 | 100 | 100 | 100 | 100 | 100 | 100 |
| Content of polypropylene (c) having melt tension, at 190° C., of not less than 3 g in 100 parts by weight of the component © | part(s) by weight | 36 | 28 | 39 | 15 | 36 | 28 | 23 | 16 | 26 | 27 | 36 | 31 |
| MFR (230° C., load of 2.16 kg) |  | 10 | 15 | 25 | 30 | 15 | 20 | 30 | 15 | 18 | 2 | 30 | 6 |
| Hardness (Shore A) |  | 78 | 75 | 70 | 73 | 78 | 72 | 72 | 91 | 70 | 80 | 75 | 86 |
| Needle penetration temperature (° C.) |  | 135 | 125 | 120 | 125 | 130 | 120 | 100 | 140 | 80 | 125 | 90 | 140 |
| Condition of foam layer |  | AA | AA | BB | BB | DD | DD | BB | BB | CC | BB | BB | CC |
| Appearance |  | AA | AA | AA | AA | AA | AA | AA | AA | AA | BB | AA | AA |
| Feel |  | AA | AA | AA | AA | AA | AA | AA | BB | AA | AA | AA | BB |

The invention claimed is:

1. A thermoplastic elastomer composition for foaming, comprising:
   10 to 40% by weight of a partially or completely crosslinked ethylene/α-olefin/non-conjugated polyene copolymer rubber (A) comprising ethylene, an α-olefin of 3 to 20 carbon atoms and a non-conjugated polyene,
   3 to 33% by weight of an ethylene/α-olefin copolymer (B) comprising ethylene and an α-olefin of 3 to 20 carbon atoms,
   10 to 40% by weight of polypropylene (C) having a melting point, as determined by differential scanning calorimetry (DSC), of 40 to 170° C.,
   10 to 45% by weight of a softener (D) for rubbers, and
   at least one substance selected from an isotactic propylene-based polymer (E-a) in an amount of 1 to 30% by weight and a syndiotactic α-olefin-based copolymer (E-b) in an amount of 1 to 20% by weight,
   with the proviso that the total amount of the components (A), (B), (C), (D), (E-a) and (E-b) is 100% by weight,
   wherein the component (E-a) satisfies the following requirements (i) to (iv):
   (i) the molecular weight distribution (Mw/Mn), as measured by gel permeation chromatography (GPC), is in the range of 1 to 10,
   (ii) the amount of constitutional units derived from propylene is in the range of 40 to 85% by mol and the amount of constitutional units derived from an α-olefin of 2 to 20 carbon atoms (other than propylene) is in the range of 60 to 15% by mol,
   (iii) the melt flow rate (MFR, ASTM D1238, 190° C., load of 2.16 kg) is in the range of 0.1 to 50 g/10 min, and
   (iv) in the differential scanning calorimetry (DSC), any melting point is not observed,
   the component (E-b) contains constitutional units (E-1) derived from propylene, constitutional units (E-2)

derived from ethylene, constitutional units (E-3) derived from an olefin of 4 to 20 carbon atoms, and optionally constitutional units (E-4) derived from a conjugated polyene or a non-conjugated polyene, the component (E-h) contains the constitutional units (E-1) in an amount of 30 to 79% by mol, the constitutional units (E-2) in an amount of 1 to 30% by mol and the constitutional units (E-3) in an amount of 10 to 50% by mol, in 100% by mol of the total of the constitutional units (E-1), (E-2) and (E-3), with the proviso that the total amount of the constitutional units (E-2) and (E-3) is in the range of 21 to 70% by mol, and contains the constitutional units (E-4) in an amount of 0 to 30% by mol based on 100% by mol of the total of the constitutional units (E-1), (E-2) and (E-3), and when $^{13}$C-NMR of the component (E-b) is measured in a 1,2,4-trichlorobenzene solution using tetramethylsilane as a reference material, the sum total of absorptions of methyl groups of propylene units observed at about 20.0 to 21.0 ppm is not less than 0.5 time the sum total of absorptions of methyl groups of propylene units observed at about 19.0 to 22.0 ppm, and the component (E-b) has a substantially syndiotactic structure.

2. The thermoplastic elastomer composition for foaming as claimed in claim 1, which comprises:

10 to 40% by weight of a partially or completely crosslinked ethylene/α-olefin/non-conjugated polyene copolymer rubber (A) comprising ethylene, an α-olefin of 3 to 20 carbon atoms and a non-conjugated polyene, 3 to 33% by weight of an ethylene/α-olefin copolymer (B) comprising ethylene and an α-olefin of 3 to 20 carbon atoms, 10 to 40% by weight of polypropylene (C) having a melting point, as determined by differential scanning calorimetry (DSC), of 40 to 170° C., 10 to 45% by weight of a softener (D) for rubbers, and 1 to 30% by weight of an isotactic propylene-based polymer (E-a) satisfying the following requirements (i) to (iv), with the proviso that the total amount of the components (A), (B), (C), (D) and (E-a) is 100% by weight, (i) the molecular weight distribution (Mw/Mn), as measured by gel permeation chromatography (GPC), is in the range of 1 to 10, (ii) the amount of constitutional units derived from propylene is in the range of 40 to 85% by mol and the amount of constitutional units derived from an α-olefin of 2 to 20 carbon atoms (other than propylene) is in the range of 60 to 15% by mol, (iii) the melt flow rate (MFR, ASTM D1238, 190° C., load of 2.16 kg) is in the range of 0.1 to 50 g/10 min, and (iv) in the differential scanning calorimetry (DSC), any melting point is not observed.

3. The thermoplastic elastomer composition for foaming as claimed in claim 1, which comprises:

10 to 40% by weight of a partially or completely crosslinked ethylene/α-olefin/non-conjugated polyene copolymer rubber (A) comprising ethylene, an α-olefin of 3 to 20 carbon atoms and a non-conjugated polyene, 3 to 33% by weight of an ethylene/α-olefin copolymer (B) comprising ethylene and an α-olefin of 3 to 20 carbon atoms, 10 to 40% by weight of polypropylene (C) having a melting point, as determined by differential scanning calorimetry (DSC), of 40 to 170° C., 10 to 45% by weight of a softener (D) for rubbers, and 1 to 20% by weight of a syndiotactic α-olefin-based copolymer (E-b), with the proviso that the total amount of the components (A), (B), (C), (D) and (E-b) is 100% by weight, wherein the component (E-b) contains constitutional units (E-1) derived from propylene, constitutional units (E-2) derived from ethylene, constitutional units (E-3) derived from an olefin of 4 to 20 carbon atoms, and optionally, constitutional units (E-4) derived from a conjugated polyene or a non-conjugated polyene, the component (E-b) contains the constitutional units (E-1) in an amount of 30 to 79% by mol, the constitutional units (E-2) in an amount of 1 to 30% by mol and the constitutional units (E-3) in an amount of 10 to 50% by mol, in 100% by mol of the total of the constitutional units (E-1), (E-2) and (E-3), with the proviso that the total amount of the constitutional units (E-2) and (E-3) is in the range of 21 to 70% by mol, and contains the constitutional units (E-4) in an amount of 0 to 30% by mol based on 100% by mol of the total of the constitutional units (E-1), (E-2) and (E-3), and when $^{13}$C-NMR of the component (E-b) is measured in a 1,2,4-trichlorobenzene solution using tetramethylsilane as a reference material, the sum total of absorptions of methyl groups of propylene units observed at about 20.0 to 21.0 ppm is not less than 0.5 time the sum total of absorptions of methyl groups of propylene units observed at about 19.0 to 22.0 ppm, and the component (E-b) has a substantially syndiotactic structure.

4. The thermoplastic elastomer composition for foaming as claimed in claim 1, which further comprises a hydrogenated conjugated diene copolymer (F) in an amount of 1 to 30 parts by weight based on 100 parts by weight of the total of the components (A), (B), (C), (D), and (E-b) and/or (E-a).

5. The thermoplastic elastomer composition for foaming as claimed in claim 1, wherein the component (C) contains polypropylene (c) having a melt tension value, at 190° C., of not less than 3 g, and in 100 parts by weight of the component (C), the polypropylene (c) is contained in an amount of 1 to 50 parts by weight.

6. The thermoplastic elastomer composition for foaming as claimed in claim 1, which is obtained by further adding a blowing agent (H).

7. A thermoplastic elastomer molded foam obtained by extrusion molding, press molding or injection molding the thermoplastic elastomer composition for foaming as claimed in claim 6.

8. The thermoplastic elastomer molded foam as claimed in claim 7, wherein the resin is heated at 110 to 250° C. during the molding.

9. A composite molded product obtained by laminating the molded foam as claimed in claim 7 onto a polyolefin-based resin substrate.

10. An instrument panel for an automobile, obtained by using the composite molded product as claimed in claim 9.

* * * * *